United States Patent
Huang et al.

(10) Patent No.: US 11,457,291 B2
(45) Date of Patent: Sep. 27, 2022

(54) ORAL CARE MONITORING AND HABIT FORMING FOR CHILDREN

(71) Applicants: Eric Enyang Huang, Andover, MA (US); Xiongbing Sun, Shenzhen (CN)

(72) Inventors: Eric Enyang Huang, Andover, MA (US); Xiongbing Sun, Shenzhen (CN)

(*) Notice: Subject to any disclaimer, the term of this patent is extended or adjusted under 35 U.S.C. 154(b) by 0 days.

(21) Appl. No.: 17/197,671

(22) Filed: Mar. 10, 2021

(65) Prior Publication Data
US 2021/0289271 A1    Sep. 16, 2021

Related U.S. Application Data

(60) Provisional application No. 62/989,169, filed on Mar. 13, 2020.

(51) Int. Cl.
*H04Q 9/00* (2006.01)
*A46B 15/00* (2006.01)
*A46B 17/00* (2006.01)

(52) U.S. Cl.
CPC .......... *H04Q 9/00* (2013.01); *A46B 15/0002* (2013.01); *A46B 17/00* (2013.01); *H04Q 2209/20* (2013.01); *H04Q 2209/40* (2013.01); *H04Q 2209/883* (2013.01)

(58) Field of Classification Search
CPC .. H04Q 9/00; H04Q 2209/20; H04Q 2209/40; H04Q 2209/883; A46B 15/0002; A46B 17/00
See application file for complete search history.

(56) References Cited

U.S. PATENT DOCUMENTS

| | | | | |
|---|---|---|---|---|
| 2008/0256445 | A1* | 10/2008 | Oleh | G16H 40/67 715/700 |
| 2010/0281636 | A1* | 11/2010 | Ortins | A46B 15/0012 15/4 |
| 2010/0299856 | A1* | 12/2010 | Majthan | A61C 17/222 15/22.1 |
| 2012/0255619 | A1* | 10/2012 | Librus | E03C 1/057 137/1 |
| 2015/0127371 | A1* | 5/2015 | Dykes | A61C 17/16 705/2 |
| 2016/0143718 | A1* | 5/2016 | Serval | A46B 15/0006 15/22.1 |
| 2017/0196408 | A1* | 7/2017 | Collins | A47K 1/09 |
| 2018/0168332 | A1* | 6/2018 | Wagner | A46B 15/0044 |
| 2018/0247565 | A1* | 8/2018 | Varga | A63F 13/24 |
| 2021/0235859 | A1* | 8/2021 | Farmah | A46B 15/0038 |

* cited by examiner

*Primary Examiner* — Amine Benlagsir
(74) *Attorney, Agent, or Firm* — Anderson Gorecki LLP

(57) ABSTRACT

A brushing tracker configured to be mounted to a toothbrush has a motion sensor and a transceiver that collect and output raw motion data. The raw motion data is received by a relay and forwarded to a cloud-based remote processing system that processes the raw motion data to determine brushing adequacy based on predetermined criteria. The motion sensor and transceiver are disposed in a flexible case. An attachment band enables the brushing tracker to be affixed to a standard toothbrush for use and affixed to a different toothbrush when desired.

19 Claims, 26 Drawing Sheets

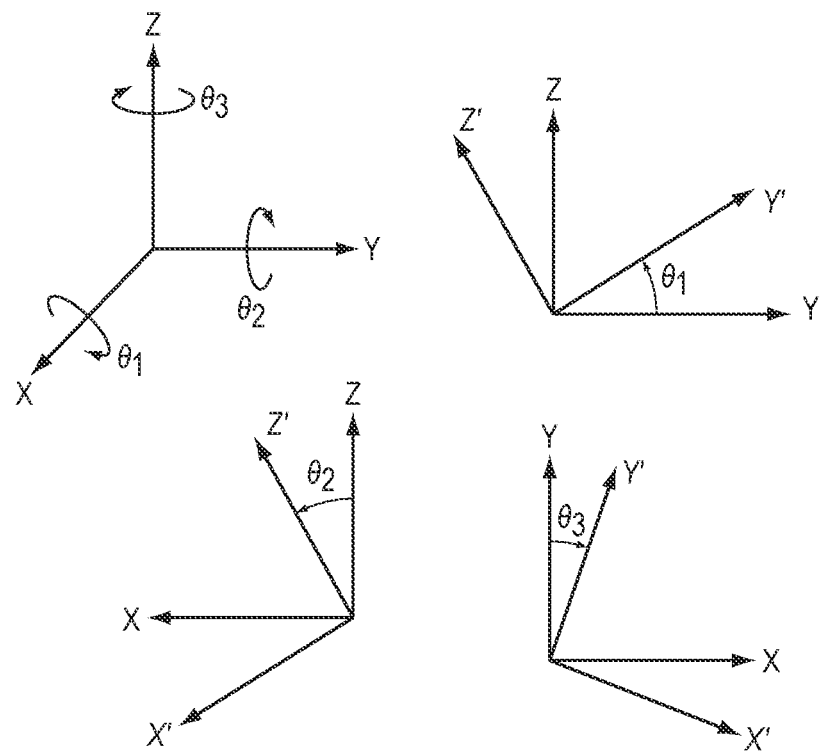
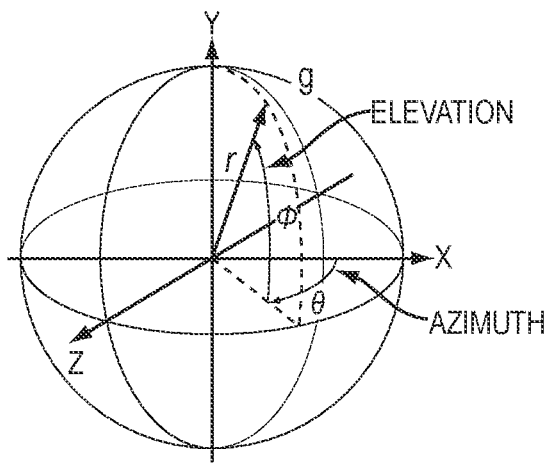
$\theta = \mathrm{acos}(x/\mathrm{sqrt}(x*x+z*z)) * \mathrm{sign}(z)$
FIG. 15

ORAL CARE MONITORING AND HABIT FORMING FOR CHILDREN

TECHNICAL FIELD

The present disclosure is generally related to monitoring systems, and more particularly to systems for monitoring children's daily oral care activities and helping children achieve and self-maintain long-term goals of oral hygiene.

BACKGROUND

Poor oral care habits can lead to tooth decay and other periodontal diseases. It is desirable for children to form good oral care habits early on and learn to adopt the correct brushing techniques. When short term anomalies are not quickly corrected, they devolve into bad habits and it is too late to easily correct the detrimental behavior. However, parents are not always present when their children are brushing. In the US, about 1 in 3 children regularly miss brushing daily. Nearly 70% of children between the ages of 5-18 brush for less than 2 minutes each time.

There are many different designs of children's toothbrushes in the current oral care market. Manual toothbrushes account for about 82% of the market. Electric toothbrushes account for the remaining 18% of the market. A small percentage of electric toothbrushes are smart toothbrushes that can record brushing activity information. Some smart toothbrushes can send brushing activity information to smartphones for review. Smart toothbrushes have not gained greater market share for multiple reasons. Smart toothbrushes are complex and more costly than manual toothbrushes. Many consumers view a toothbrush as an inexpensive consumable product, so consumers are reluctant to buy a more costly product that performs the same basic function. Moreover, many consumers prefer a specific design of manual toothbrush, or like to change designs frequently or use a specific brand. Those designs and brands may not be available as smart toothbrushes, and smart toothbrushes are too expensive for most consumers to replace when they want a new design.

SUMMARY

All examples, aspects and features mentioned in this document can be combined in any technically possible way.

In accordance with some implementations a toothbrushing monitoring system, comprises: a tracker configured to be mounted to a toothbrush and comprising at least one motion sensor and at least one transceiver, the tracker configured to use the motion sensor and transceiver to output raw brushing data; and a remote processing system configured to receive and process the raw brushing data to determine brushing adequacy based on predetermined criteria.

In accordance with some implementations an apparatus comprises: at least one motion sensor and at least one transceiver configured to output raw motion data, the at least one motion sensor and at least one transceiver disposed in a case that is configured to be mounted to a toothbrush, whereby the raw motion data is indicative of brushing activity.

In accordance with some implementations a method comprises: sensing and outputting raw brushing data with a tracker configured to be mounted to a toothbrush and comprising at least one motion sensor and at least one transceiver; and receiving and processing the raw brushing data by a remote processing system to determine brushing adequacy based on predetermined criteria.

In accordance with some implementations a toothbrush tracker is an add-on device that is not built into the body of a toothbrush but works with a wide variety of types of toothbrushes, manual or electric, and with different sizes, handles, and grips. The tracker is part of a tracking system that can include connectivity to a data receiver of a processing system that does the processing of data received from the tracker. The tracker can communicate data to the data receiver via one or more relays. A relay can be local to the tracker and the data receiver and processing system can be remote to the tracker. The tracker and relay can communicate using, for example, local wireless communication technologies. The relay and data receiver can communicate over any remote network technology, including, but not limited to, the Internet and World Wide Web.

In accordance with some implementations, after brushing activity data is collected, the data is processed, aggregated, analyzed algorithmically and outputs are sent to parents and, optionally, dentists to review. In this process, brushing data is collected, compiled, and analyzed for anomalies and improvement suggestions. Parents can be presented with information regarding brushing duration, timestamp, quadrant and coverage analysis, gesture consistency, switching frequency, as well as suggestions for areas of improvement. Parents and dentists can have access to not only the last activity log, but also the complete information of historical activities. The system may provide automated alerts for short-term anomalies, such as missing brushing or brushing for too short a time, as well as longer-term habitual deficiencies, such as imbalance coverage of quadrant and brushing consistency. Such alerts can be provided at the recommendation and discovery of the system utilizing historical brushing data and smart algorithms.

In accordance with some implementations, the tracker uses a single coin cell battery such as CR1616 to power a low-current motion sensor. Other off-the-shelf batteries of similar size and capacity could be used. These types of batteries are commonly sold and are easily accessible in the market. During activity, the motion sensor outputs data to a compression processor for pre-processing to reduce data bandwidth requirement during wireless transmission. A pre-processing unit can be configured to perform data encryption, adding digital signature for authentication, as well as perform hashing and message digest, CRC for integrity check. To achieve higher signal-to-noise ratio with an electric toothbrush with a high frequency base band of vibration, the sampling rate of the motion sensor can be configured to be higher than the data output rate to the data receiver. A compression processor can be configured to apply low-pass filtering to convert the over-sampled data stream from motion sensor into purified signal to remove noise due to such base-band vibration and others. The pre-processing unit then performs data compression and sends the resulting data to the data receiver.

In accordance with some implementations, the design reduces footprint, cost, and power budget requirements by utilizing a wireless transceiver without the need of onboard floating-point computation. The tracker does not perform complex data mining, comparison and/or analytics. The tracker acts as a data gatherer or recorder with an intelligent power management process for turning ON and shutting OFF after each brushing activity. After data is received by the data receiver, a brushing algorithm is used, based on the result of at least one motion sensor of the tracker and a brushing model, to estimate if this was a proper brushing activity. The algorithm can utilize the brushing model to determine the start and end of the brushing, as well performance and quality indices about quadrant coverage, consistency of brushing gesture, and efficiency. The algorithm and model can be optimized to operate using single source of motion data, such as from an accelerometer for reduced BOM (bill of materials) cost. The algorithm can be designed to run on the data receiver end, such as on the relay or in the cloud. The brushing model, which is used by the brushing algorithm, represents motion and gesture patterns for brushing activity, which can be different for manual toothbrushes and electric toothbrushes. A different model can be trained and used for each different user for better accuracy.

In accordance with some implementations, the tracker is water and dust proof and supports several ways of easily attaching and detaching onto/from any toothbrush. The tracker may include peripheral component such as an LED, a buzzer, a vibrator, or any combination of them, to alert the user if brushing activity has not met thresholds for duration and/or quadrant coverage and/or if brushing activity has met or exceeded the recommended thresholds for duration and/or quadrant coverage, e.g., based on defined gesture and duration recommendations embodied in the brushing model and algorithm and brushing activity detected by the tracker and sent to the data receiver and processing server.

In accordance with some implementations, the system enables intuitive and easy access to information for monitoring a family member's latest brushing statistics. User's brushing timestamp, duration, and quality indices, as well as histories, can be recited via smart speakers, such as Amazon Alexa, Apple Siri and Google Assistant. A vocal or voice interface for such queries may be more intuitive and effortless compared to using a smartphone app or a PC. A dedicated display panel can be wirelessly connected to the proposed tracking system, e.g., in the cloud, and used to display the latest brushing activity along with a score for each member in a family. Such panels can be conveniently placed in a common living area, a bathroom, or a kitchen, where everyone can monitor the progress and encourage each other to perform better over time. The same data or information can additionally or alternatively be available via any other type of display or output.

In accordance with some implementations, dentists and parents can conveniently access the latest brushing activities of patients and children via a web-based dashboard. A system component providing privacy control on what data to share and who and how the viewing entity can access the data can be provided. The dashboard provides detailed information for each brushing activity as well as progress for each patient over time on some of the key performance indices. The system allows additional interfaces for data visualization and notification beyond the traditional smartphone and tablet interface.

In accordance with some implementations, the system can allow children, or parents, to designate other children as "friends" and children can view their friends' brushing activity, quality and score. The system compares everyone's brushing activity using a comparator algorithm and outputs a ranked list with a set of criteria and time interval. The ranking results are then available for parents as well as children to access and discuss. The design helps to motivate children to pursue and maintain a higher ranking among their friends and families. In a slightly different aspect, after a brushing activity completes, the data of brushing can be compared with models of a set of demographic population. Such comparison is particularly useful to gauge on the child's brushing performance among its peers, in an age group and/or for a defined demographic population with similar geo-social and/or socioeconomic characteristics.

Various aspects of the inventive concepts will be described more fully hereinafter with reference to the accompanying drawings, in which some exemplary implementations are shown. However, the inventive concepts may be implemented in a wide variety of different ways and should not be construed as limited to the exemplary implementations.

BRIEF DESCRIPTION OF THE FIGURES

FIG. 15 illustrates the coordinate systems.

DETAILED DESCRIPTION

Figure 1:
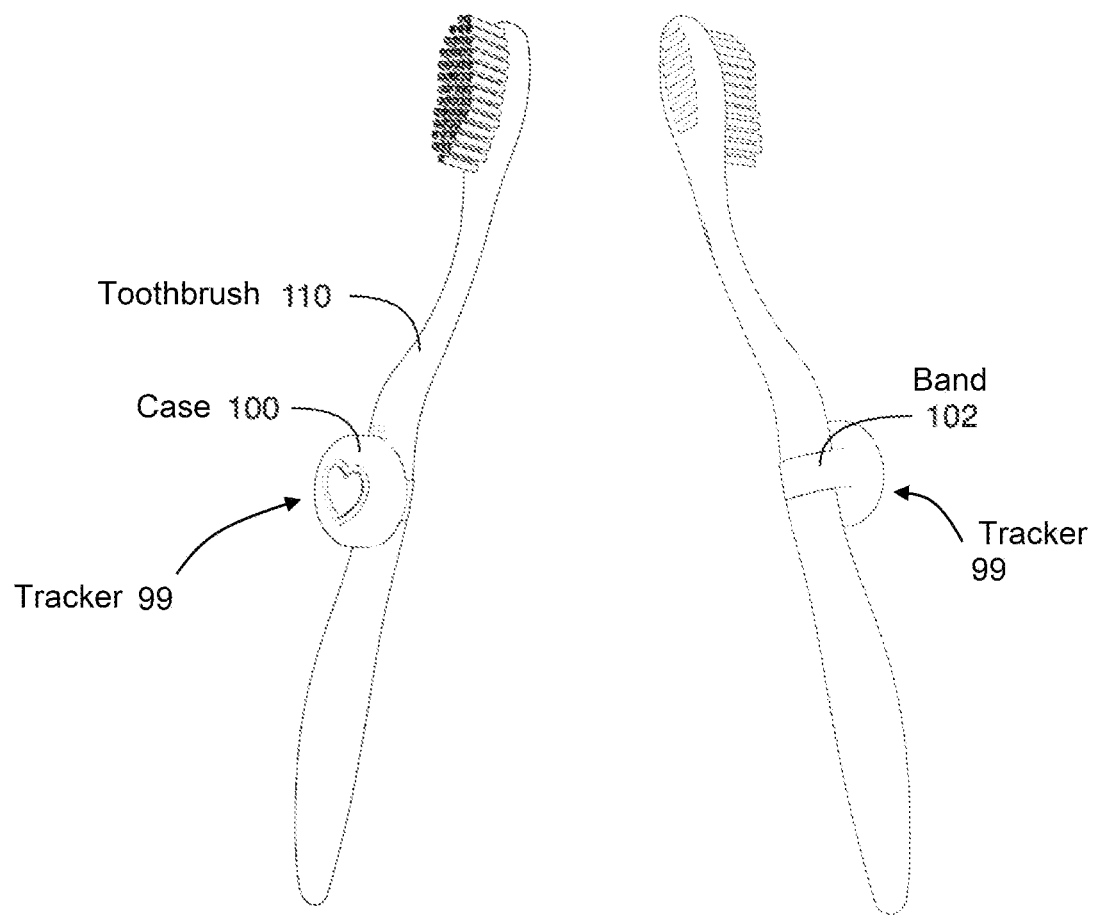
FIG. 1 illustrates a brushing tracker configured to be temporarily affixed to a user's toothbrush.
Figure 2A:
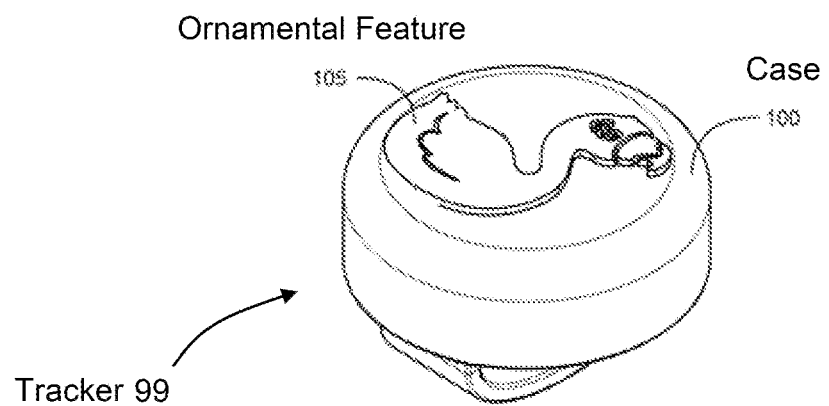
FIGS. 2A and 2B illustrate the tracker casing and attachment band in greater detail.
Figure 2B:
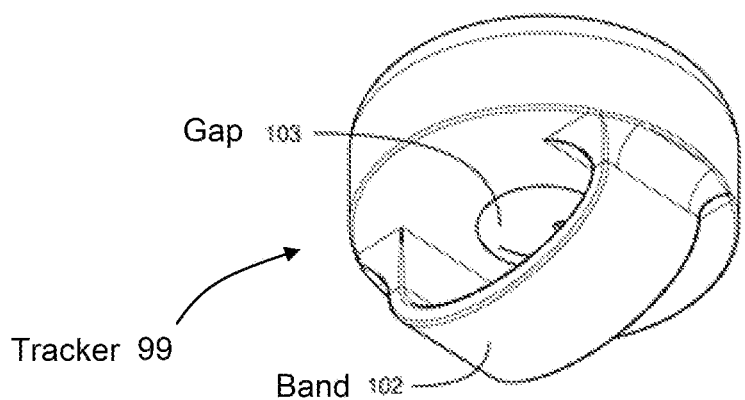
Figure 3:
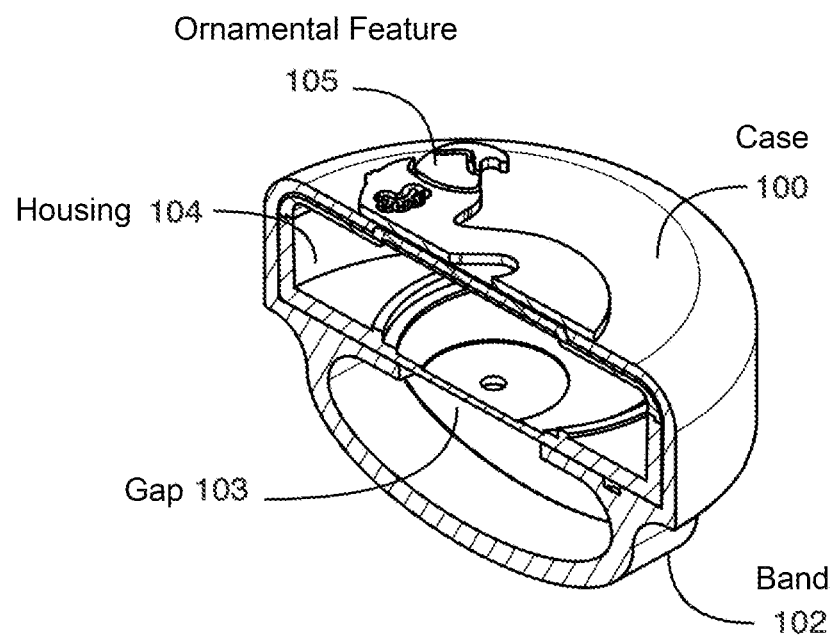
FIG. 3 is cross-sectional view of the tracker.

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used herein is intended to be interpreted broadly within the limits of subject matter eligibility. Although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense. When an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). The terminology used herein is for the purpose of describing particular implementations only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof. To the extent that functional features, operations, and/or steps are described herein, or otherwise understood to be included within various embodiments of the inventive concepts, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor. Process steps illustrated in example flow charts may be executed in order(s) other than that illustrated, and additional steps may be added or illustrated steps may be deleted without deviating from the spirit of inventive concepts.

Smart toothbrushes are expensive and often rely on presence of a tablet or smart phone for data export and analysis. This is problematic because the paired smartphone or tablet may often be out of range of the smart toothbrush when brushing occurs, e.g., when the smartphone or tablet belongs to a parent who is out of the home for work all day. Reliance on Bluetooth or cellular links also leaves mobile applications suspended in the background on the smartphone or tablet. Further, parents may not want their children to have their phones or tablets in the bathroom where the devices are more likely to be damaged.

Referring to FIGS. 1, 2A, 2B, and 3, an electronic brushing tracker 99 is configured to be temporarily affixed to a user's toothbrush 110. The tracker includes a sensor that detects movements of the toothbrush as the toothbrush is picked up, has toothpaste placed onto its bristle, and moves during the brushing session, cleaning, and getting stowed. The tracker may be attached to the toothbrush in a way that the relative orientation and placement of the tracker with respect to the toothbrush are known. The measured movement of the tracker can then be translated mathematically into the actual movement of the toothbrush using a reference coordinate system and relative orientation and displacement. Detected movement data is uploaded to a cloud-based application that analyzes and stores the data. Wireless links that do not rely on use of a nearby smartphone may be used. Consequently, the user is not required to purchase a smart toothbrush or be close to a smartphone when brushing.

An attaching band 102 may be used to reversibly attach the tracker 99 to a variety of different sizes and styles of toothbrush. Detachability enables the tracker to continue to be used each time the user's toothbrush is replaced. The tracker is simply removed from the old toothbrush and affixed to the new toothbrush. Alternative attachment techniques may include adhesives and coupling structures such as hook, tape, dock, zipper, screw etc. The position of the attachment can also be configured by the user. The tracker may be attached to the handle, the neck, the head, or provided as a dock of the toothbrush.

The sensor and other electronics are enclosed in a housing 104 that is disposed inside a silicone case 100. The housing 104 is made of food grade plastic, glass or metal and is waterproof and dustproof. The shape of the housing may be round, rectangular, or any other geometric shape. The housing may be sealed at the factory using an ultrasonic welding process such that is cannot be reopened by the consumer, e.g., for battery replacement.

The attaching band 102 may be integral to the silicone case 100. The silicone case can have a "ring" shape design that extends its body with the integral attaching band 102 to form a "hole" for toothbrush 110 to be inserted through. An assembly gap 103 can be left on the bottom surface of the case to allow insertion and orientation of the housing 104 into the silicone case. In other implementations, the tracker can include and attachment structure that is not ring-shaped, e.g., a clip and/or an adhesive. The silicone case could include any of a variety of ornamental features 105, such as emojis, names, initials, logos, children's characters, mascots, etc.

Figure 4A:
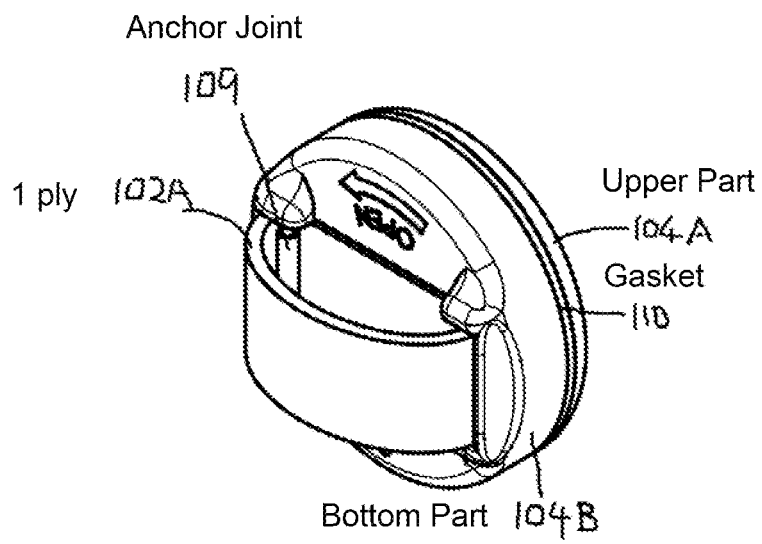
FIGS. 4A and 4B illustrate another implementation of the attachment band and housing.
Figure 4B:
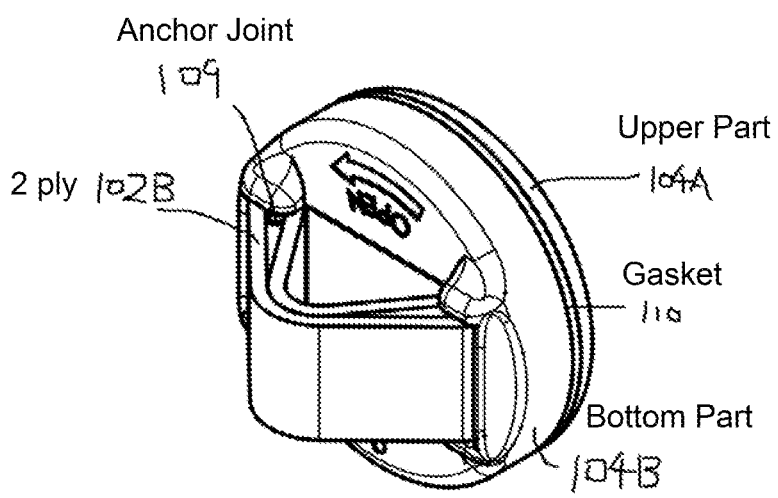

Referring to FIGS. 4A and 4B, a multi-part housing has an upper part 104A and a bottom part 104B that can be separated, e.g., for the replacement of the battery. The two parts can be connected together via a mechanism such as clipping or screwing. A sealing gasket 110 is disposed between the two parts 104A, 104B. In the illustrated example the attachment band is a closed loop attached to the housing via two anchor joints 109. The closed loop attachment band can be adjusted to be "1 ply" 102A or "2 ply" 102B depending on the circumferences of toothbrush handle or neck.

Figure 5:
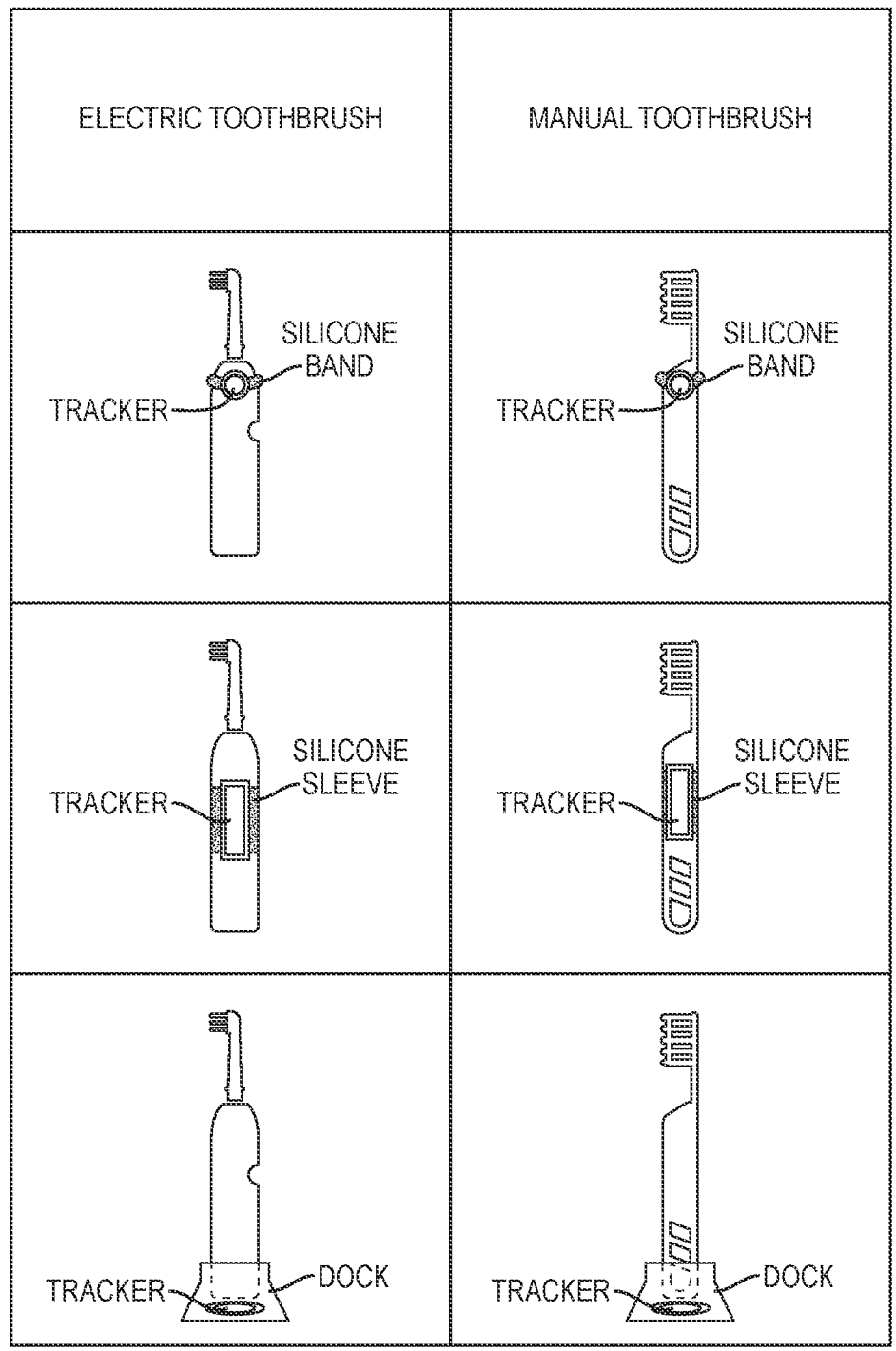
FIG. 5 illustrates different form-factors of the tracker.

Referring to FIG. 5, the tracker or housing could be embedded into a cylinder-shaped sleeve made of silicone that can be fitted onto, or received by, the handle of the toothbrush. The sleeve can be thin and configured to form a good grip with its soft texture. The sleeve also can fit onto handles of different circumferences. It is possible to build the tracker into a toothbrush dock. The toothbrush is inserted into the dock and is secured with friction or structural mechanics with the dock. In all these design examples, attachment options are designed to be easy to operate and provide stable mechanical binding between the toothbrush and the tracker. In various embodiments, the dock can include relay technology, i.e., act as a relay to a remote data receiver. The tracker, its casing, sleeve and dock may include markers to assist users to attach onto the toothbrush with the correct orientation and inclination.

Figure 6:
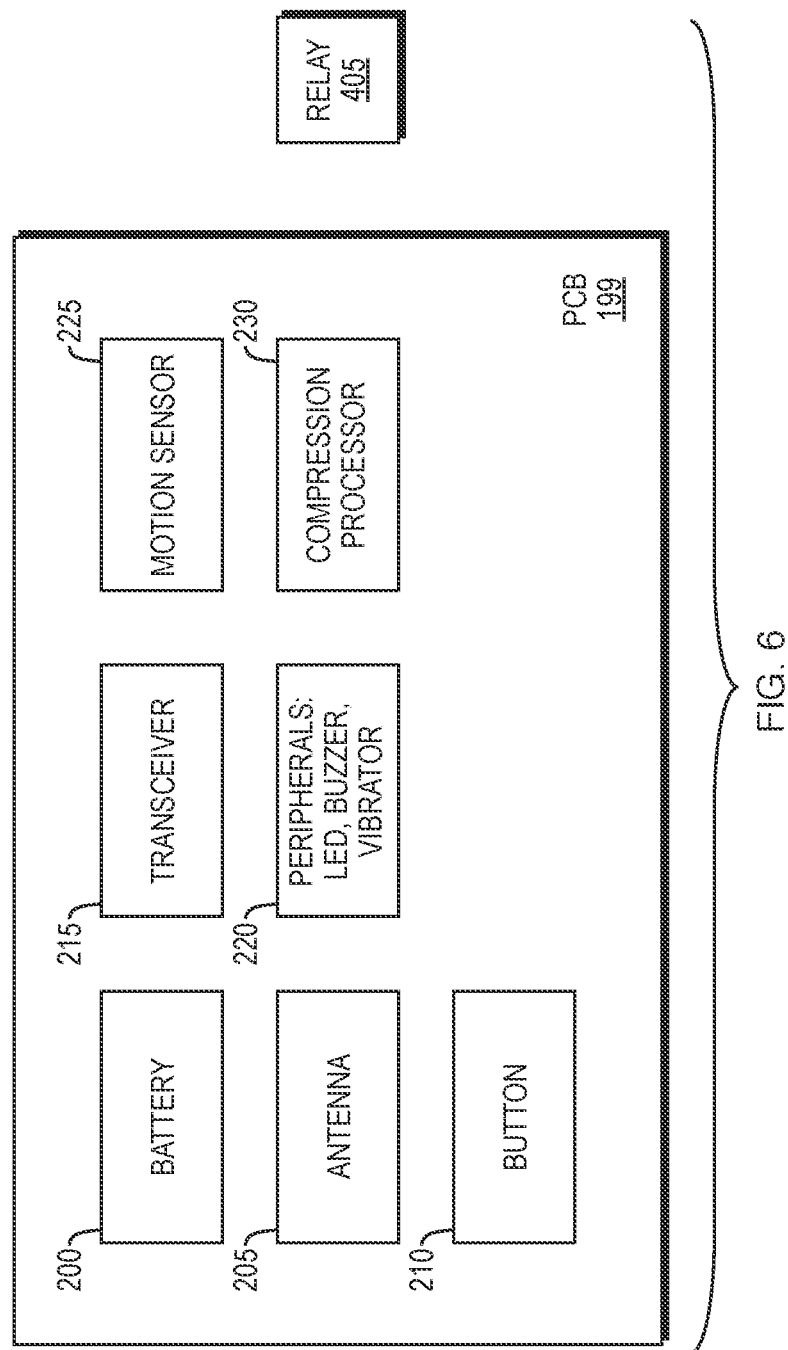
FIG. 6 is a component block diagram of the tracker.

Referring to FIG. 6, the electronic components of the tracker may include a printed circuit board (PCB) 199, a battery 200, a button 210, a wireless transceiver 215, an antenna 205, a compression processor 230, one of more motion sensors 225. The tracker could also include feedback peripherals 220, such as a LED, sound generator (e.g., a buzzer), vibrator or a combination of these and their drivers. To reduce or minimize power consumption, the tracker does not perform any complex data inference or analysis of the measurement data. Rather, the tracker packs and pre-processes the data using a compression routine and sends the packed and pre-processed output to a data receiver for further processing. The wireless transceiver 215 communicates with a data relay 405 for data transmission.

The relay 405 is installed within the vicinity of the tracker and communicate with the tracker using low energy wireless protocols. The relay facilitates data communication by forwarding the data from the tracker to a remote data receiver and tracking processor (e.g., a server) over Wifi or a Cellular network. Instructions from the remote tracking processor (or server), sent back to the tracker, are received at its transceiver 215 (data receiver) via the relay 405. The relay can be configured to forward data "as-is" between tracker and data receiver, or perform additional pre-processing with the data payload such as data compression, de-compression, encryption, decryption, hashing, digital signature, message digest etc.

Quantization is used to bucketize motion data into integer units and to reduce bandwidth requirements during transmission. In the case of using a 3-axis accelerometer as a motion sensor of the tracker, the output of the sensor is represented by a 3-tuple, each representing the acceleration measured along the co-conjugate x, y and z axes. A selectable scale of quantization step can be configured for each measurement unit to be 2 g/4 g/6 g/16 g. Since the tracker does not perform complicated data processing, such as orientation modeling and complex motion recognition algorithms, a low-end transceiver processor without floating-point computation capability is sufficient in various implementations. The data may be sent uncompressed or compressed with the help of the compression unit 230 to minimize payload and power consumption during transmission.

The peripherals 220 can include, as examples, LEDs, vibrators, buzzers or a combination among them. Based on the real-time brushing data received, a command can be sent back to the tracker to turn on and off the feedback peripherals. For example, when a brushing session has reached recommended duration time, or some anomalies are detected, the tracker's buzzer can be turned on. To differentiate among multiple intentions, a different sound pattern for the buzzer, flashing pattern for the LEDs, or a vibration pattern for the vibrators can be used depending on the anomaly or failure to meet a threshold duration time. The mapping of a specific pattern with intention it represents can be configured.

Figure 7:
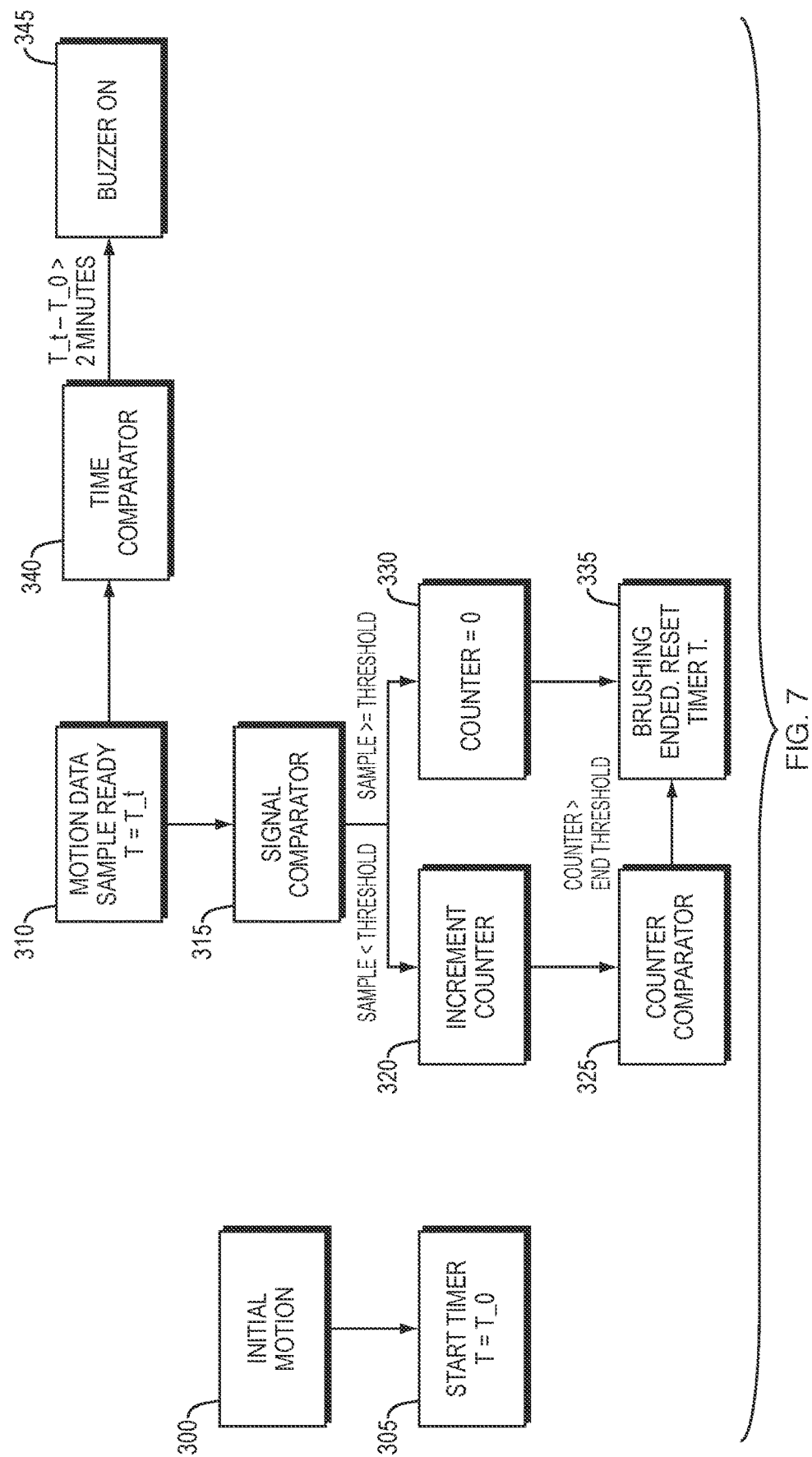
FIG. 7 illustrates a brushing duration alert process.

Referring to FIGS. 6 and 7, the peripherals 220 can be turned ON by the tracker with the help of a timer, comparators, counters, and some simple circuitry. A timer 305 starts after sensing initial motion. A signal comparator 315 continuously monitors output data 310 from an accelerometer during a brushing activity. If the magnitude of motion signal is less than a defined threshold, an instruction is sent to increment a counter 320. If the magnitude of motion signal is greater than a defined threshold, an instruction is sent to reset the counter. When the counter value exceeds a predefined ceiling threshold, the brushing activity has ended, and the counter is reset 330. If the time elapsed since the beginning of brushing is longer than a recommended brushing duration, such as 2 minutes, as determined by time comparator 340, a peripheral circuit is momentarily turned ON 345 to provide audio and/or visual feedback and is turned OFF after a RC-circuit controlled delay. The definition of motion signal and its comparison with threshold values can be carried out on individual components of a vector output from the motion sensor, or a mathematical combination of the components, without deviating from the main concept.

Figure 8:
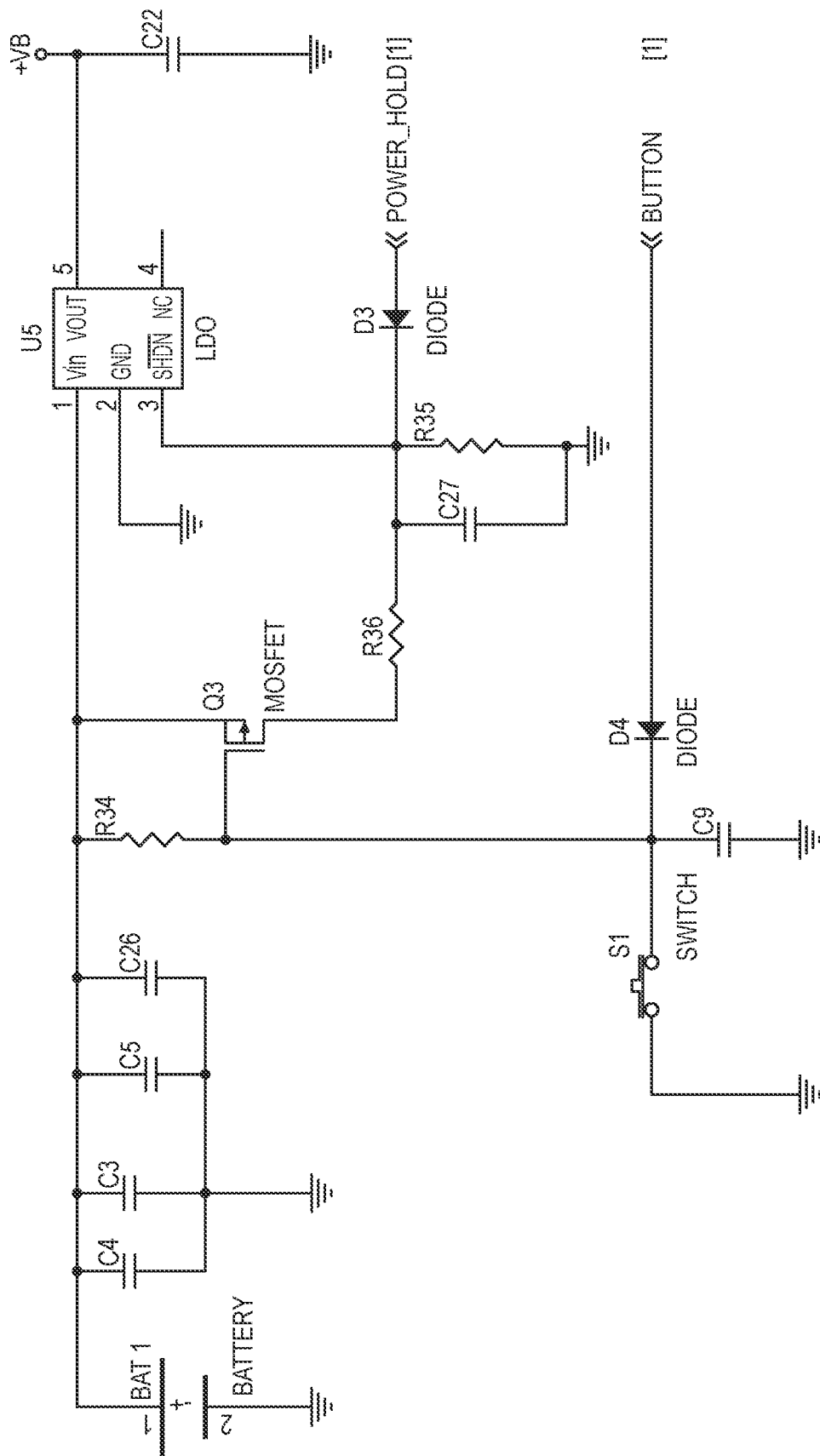
FIG. 8 illustrates an LDO circuit.

Referring to FIG. 8, an LDO (low dropout) regulator or transistor can be used to implement a "shelf-mode." During transportation and the holding period when trackers are sitting in a warehouse of a retailer or are in-transit, components of the trackers are shut off from the battery power supply. During this period, the battery is only drained via the shutdown current of the LDO via a pull-down resistor. At the factory, after testing is complete, the tracker is put into "shelf-mode" with the button. This turns off the POWER_HOLD IO signal to power off the LDO. When the tracker arrives at the user, the user presses on the button once. This turns on the LDO to power up the tracker. Once the tracker is turned ON, the transceiver keeps POWER_HOLD signal high to maintain the power on state.

Figure 9:
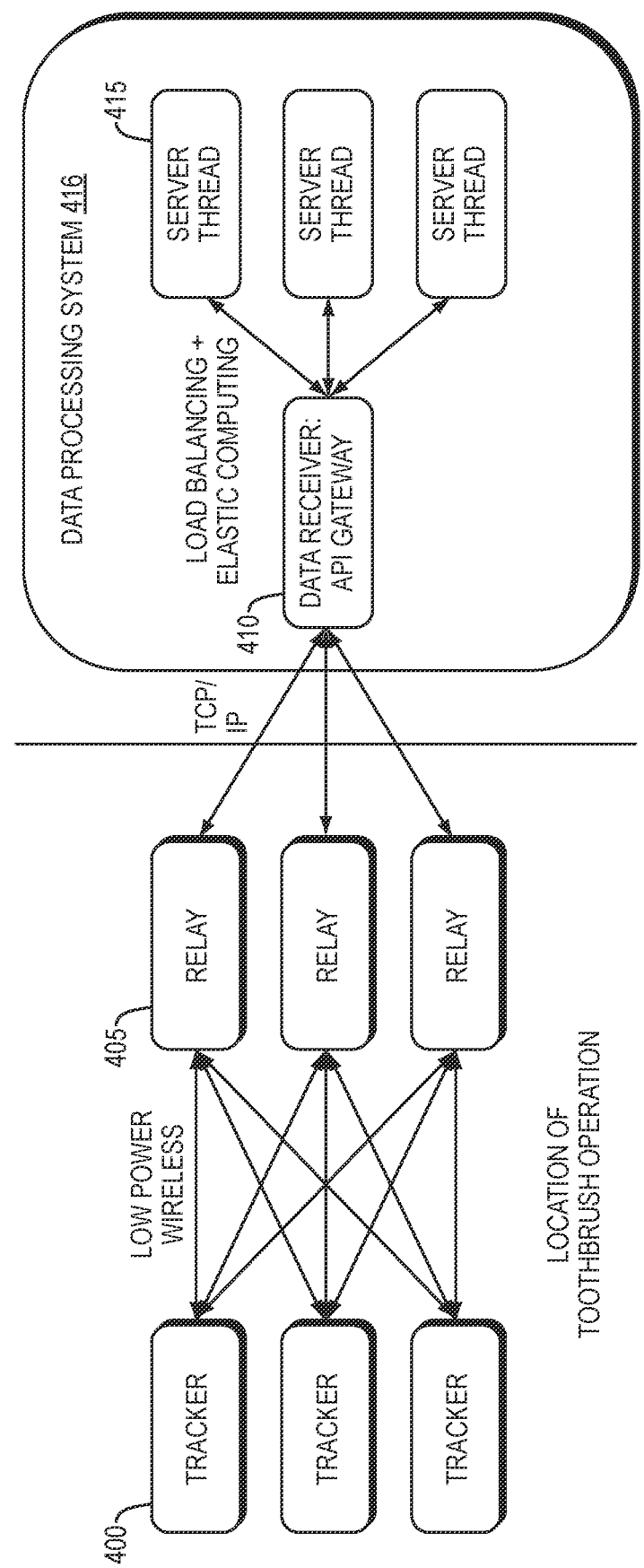
FIG. 9 illustrates connectivity between trackers, relays, and a server in the cloud.

Referring to FIG. 9, trackers 400 communicate with a data processing system 416 in the cloud via relays 405. This design yields good energy performance for the tracker, allowing it to run power efficient wireless protocols such as Bluetooth LE, Zigbee, Zwave or LoRa with battery. The relays 405 can be powered by wall sockets or other types of power sources such as mobile power banks. The relays can be connected to a WiFi or LTE network, or the like, for Internet access. Once a relay receives data from a tracker 400, it sends the data to a data receiver 410, such as a remote server, for processing. Little or no signal processing runs on the relay other than receiving and forwarding data to and from the tracker and data processing system and making sure data transmission is efficient and secure. Optionally, the relay and/or tracker performs optimization on the data packet for the purpose of bandwidth optimization and data security reasons, including but not limiting to data compression/decompression, encryption/decryption, digital signature, authentication, hashing and/or message digest. Multiple relays can be installed and configured to work with a single tracker or multiple trackers.

Figure 10A:
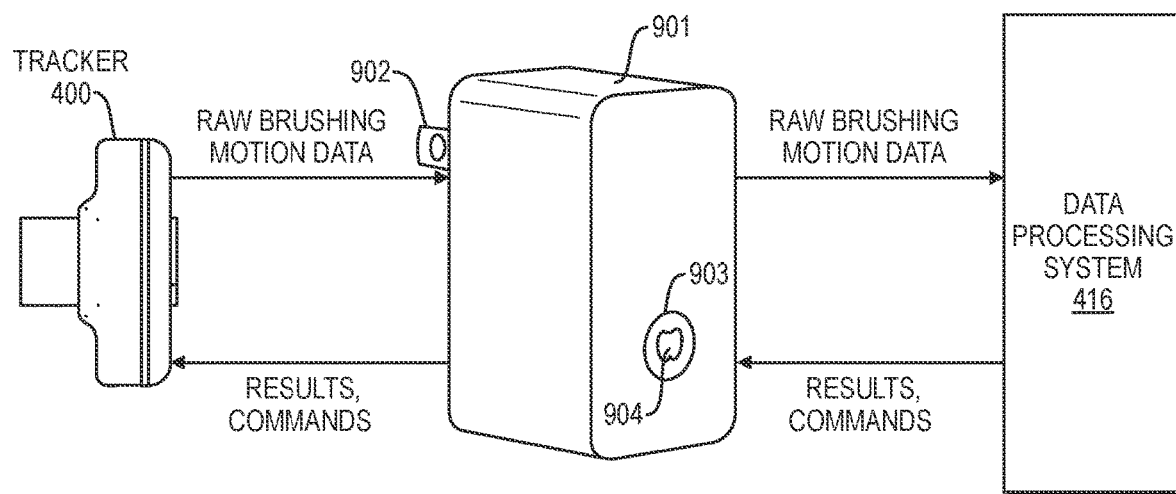
FIG. 10A illustrates the exterior housing and components of a relay form factor that plugs into wall socket, as well as the relay's wireless message interactions with trackers and data processing system.
Figure 10B:
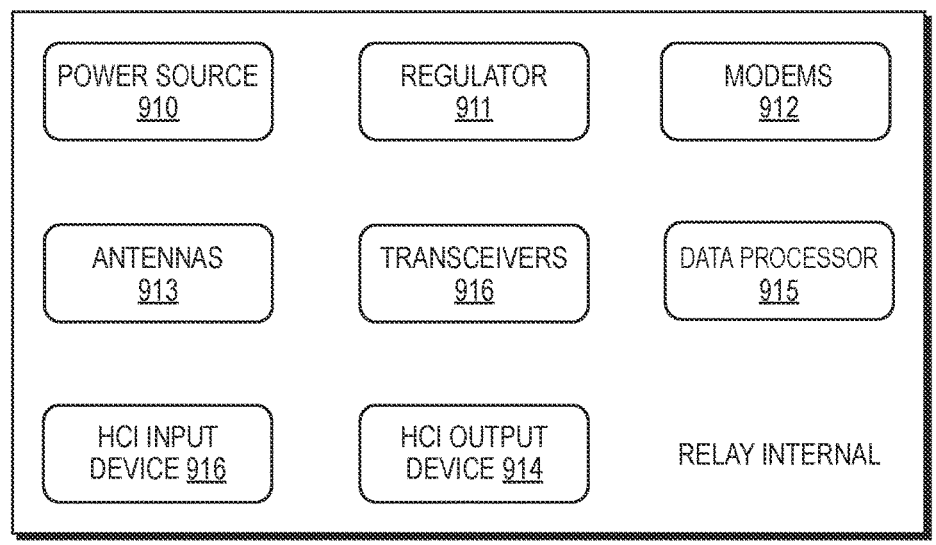
FIG. 10B is a component block diagram of a relay device.

Referring to FIG. 10A, a relay can be a separate hardware device whose single function is to facilitate communication between the trackers and data receiver. In this case, a relay is composed of its own relay housing 901 and internal components illustrated in FIG. 10B. The relay can be powered by a battery or an external power source such as wall socket via plugs 902. HCl input device 903 such as a button is used to configure relay and receive user instruction. HCl output device 904 such as a LED, speaker or display is used to output the internal state of the relay and provide relevant information back to user.

In various embodiments, the relay receives raw brushing motion data from trackers 400 and then forward it to the processing system 416. After processing, results and commands such as turning on and off peripherals are communicated back to trackers 400 via relay.

The internal components of a relay include or consist of power source 910, either a built-in source or from external, a power regulator 911 for power management, including an AC/DC transformer if external AC power source is used. To communicate wirelessly with trackers and data processing system, a relay also includes transceivers 916, modems 912 and antennas 913. Typical wireless communication protocol between tracker and a relay use Bluetooth, LoRa, Zigbee or ZWave. The wireless communication between relay and remote data processing system can include Wifi, 4G/LET cellular or via satellite. In each case, a set of compatible antennas and their resonate circuitries, transceivers and modems is needed. To be able to communicate with tracker and data processing system in two different wireless protocols, two sets of the transceivers, modems and antennas are needed in a relay and can co-operate without interference. A relay also includes an optional data processor unit for data compression/decompression and encryption and decryption. A relay includes an optional internal HCl input device 916 that matches 903 such as a button, and an optional internal HCl output device 914 that matches 904 such as an LED, speaker or display.

Without deviating from the main gist, a relay can also be a component of another device and share common components such as antenna, power source, decoder, modem with the other device. The relay device can also be written in software and run on another device with necessary hardware components. For example, the relay can be a software module that runs a smart speaker, fiber network modem, a smart phone, an IoT camera, a computer, a router etc. These devices already include the components needed for the relay to work, such as wireless antenna, transceiver, and modem for Wifi and Bluetooth, a microcontroller, power source, memory, clock. The relay can exist as just a software component that runs on these devices, with the same functionality and system effect compared to a standalone relay device. Limitations associated with using a smartphone or a tablet include limited support of wireless protocols and repeated pairing when adding a new tracker, as well as reliability, connectivity range and frequent absence and rejoin when traveling in and out of the range of the trackers. Some of these limitations could be avoided by integrating the relay with a virtual assistant and other devices that are not moved like a smartphone such as Amazon Echo, Verizon Modem, or Google Dot.

When motion data of a brushing activity becomes available, the tracker advertises to the relay that new data is available, and the relay downloads or pulls the data over a wireless connection and performs packet integrity check. The relay then forwards the data onto the data receiver/server(tracking system) for processing. The communication between relay and server can be over TCP/IP, such as HTTPS or MQTT, or any comparable technology, whether presently existing or later developed. Included in the data can be a timestamp, ID of the sensor, ID of the relay, a sequence number, and/or some auxiliary information, as well as the movement payload data. In various embodiments, the relay compares the sensor ID to see if it is associated with a tracker that it is responsible for managing. Due to the distributed nature of the system, data packets describing the same brushing activity may arrive at the server via different relays and may arrive at the server out of order. It becomes the server's responsibility to ignore redundant packets based on sensor ID, relay ID and timestamp, and buffer out of order packets until all the packets are collected before processing. In various embodiments, there is a retry logic in the relay in case the data processing fails on the server, and the relay is notified. In this case, the relay will download data from the tracker and send it to the server to try again. If data processing succeeded, the relay is also notified, and no repeated upload is performed.

The data-in-transit security between the tracker and the relay can be protected by the wireless protocol, such as Bluetooth pairing, as well as business level security logic embedded in the protocol and data structure. The data-in-transit security between relays and server can be guaranteed by X509 certificate-based protocols, such as MQTT and TLS/SSL. In both cases, secrecy, non-repudiation, freshness, and accountability are achieved in these protocols to ensure data is securely transmitted with origin of the data identified and delivery of the data verifiable.

The tracker can send motion data about brushing activity as soon as it detects any movement from the motion sensor. The tracker continuously outputs motion data until the movement stops and stays idle for a defined period of time before going into the low power mode. In an aspect of the design, the tracker does not require flash memory for movement data storage and can send data to relays as they become available using just volatile memory. This design reduces BOM cost and saves space for other electronic components.

In some embodiments, movement data is first stored in a data storage system when it arrives at the server. Due to the asynchronized aspect of data transmission, a new server thread 415 is created to handle each data packet reporting. The server thread first saves each packet of motion data into a database. The server thread then checks to see if it has all data packets relating to the same brushing activity in hands and verifies the digest for integrity. In an aspect of the design, each data packet is assigned with an index counter that is monotonically increasing when they are generated and transmitted by the tracker. The tracker also adds a flag indicating if this data packet is the last packet from an activity before toothbrush becomes idle. Combining the packet index and last-packet flag, the server can concatenate multiple packets for a single brushing activity into a large data set. The data set is then sent to a data processing engine for analysis.

Figure 11:
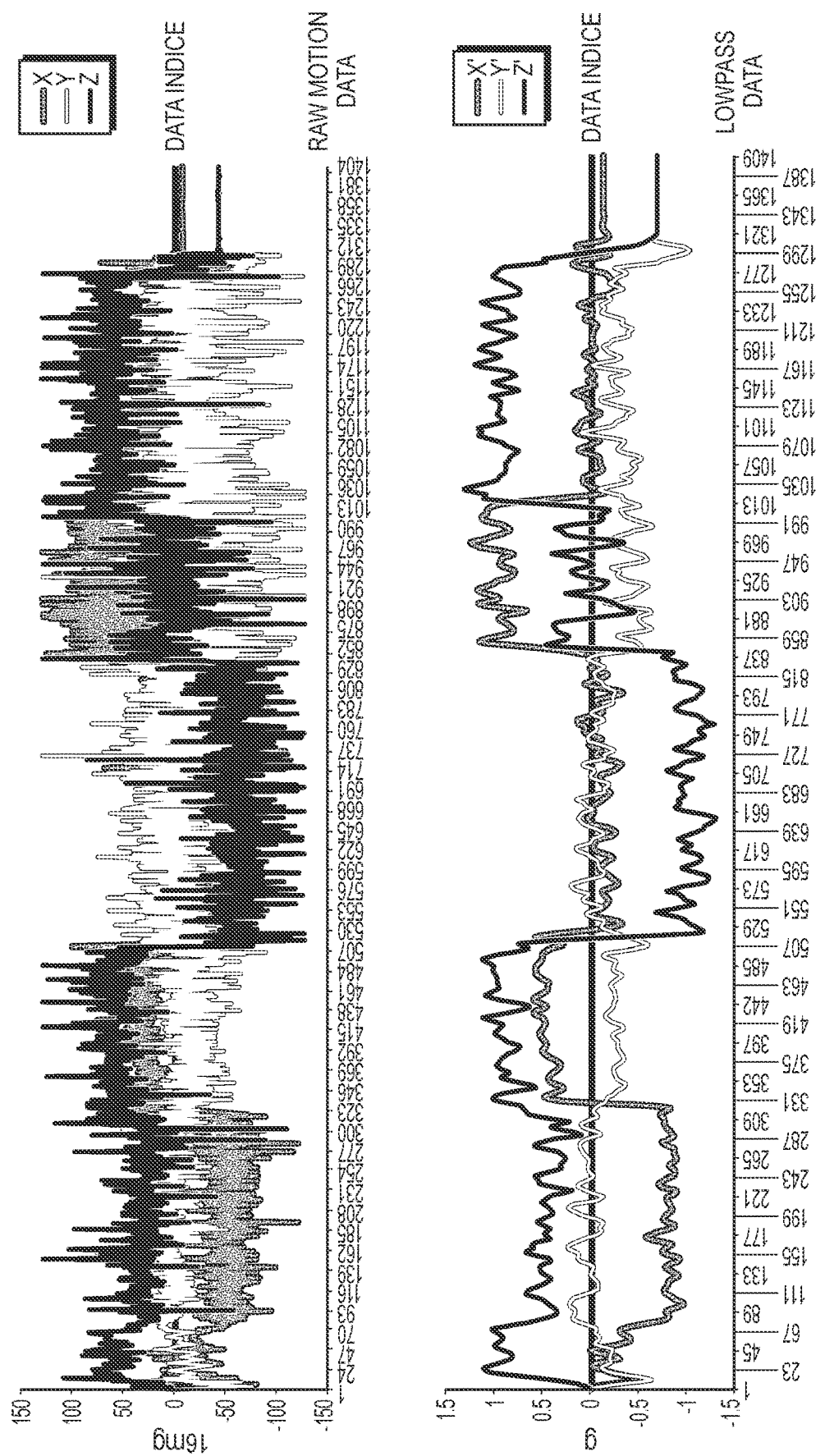
FIG. 11 illustrates the output of a low-pass filter in the pre-processing unit for a brushing session using 3-axis accelerometer as motion sensor.
Figure 12:
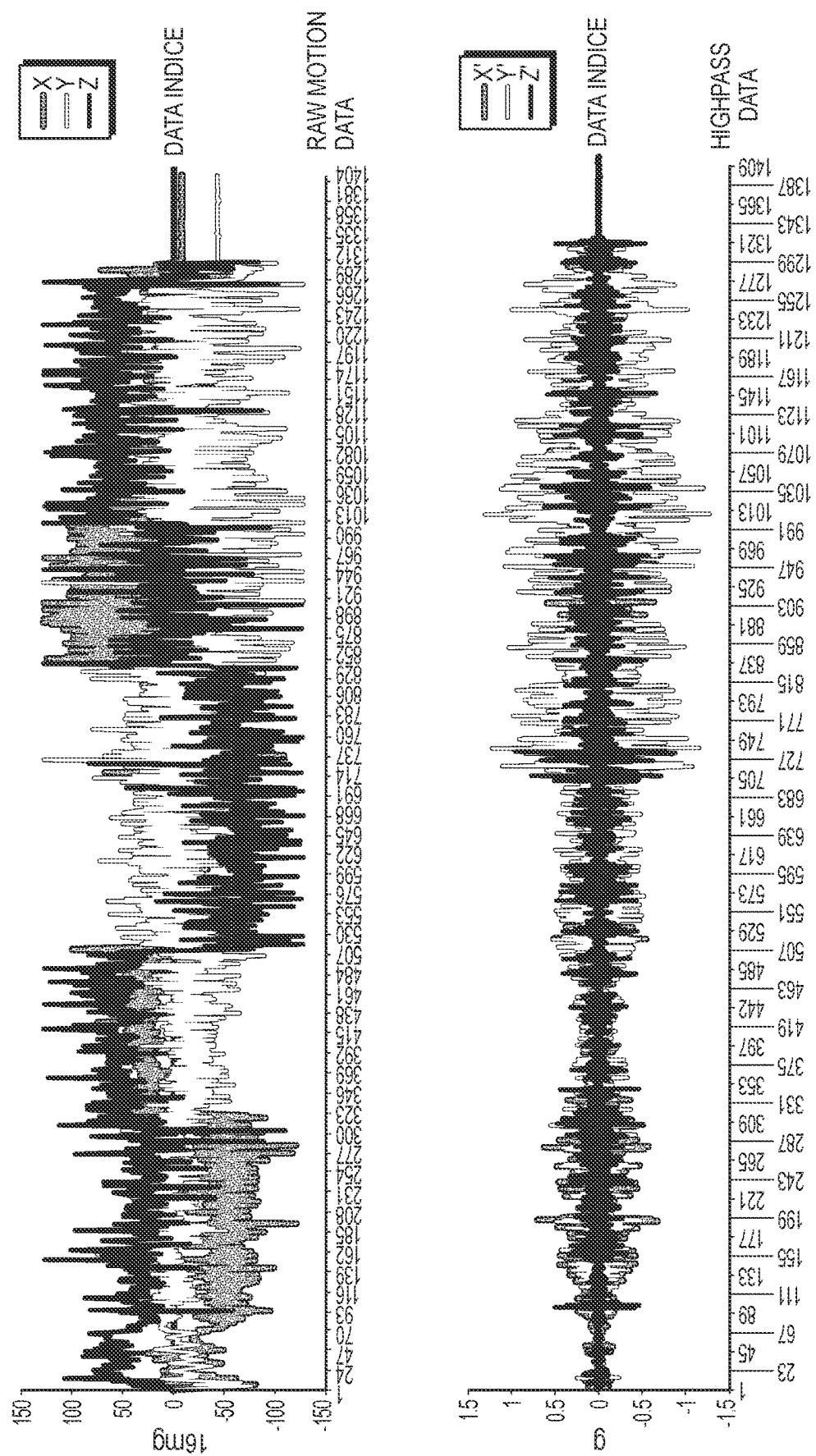
FIG. 12 illustrates the output of high-pass filter from the pre-processing unit using 3-axis accelerometer as motion sensor.

A data processing engine takes in a complete data set describing a brushing activity, and outputs performance indices related to that event. In various embodiments, the engine comprises a pre-processing unit, a false-positive detector, a quadrant analyzer, and a score generator. The pre-processing unit's role is to convert raw movement data into a format that is ready for algorithmic analysis. It filters out any outliers and obvious observation errors from the raw data. In various embodiments, the pre-processor applies Butterworth band pass filter to eliminate irrelevant noise from the raw data. This process separates user's hand movement signal from the base-band vibration resulted from the motor in a power brush. The same filtering technique can be applied for manual toothbrushes with temporal fluctuations in signals generated from holding and moving toothbrushes without significantly changing the pointing and orientation. The cut-offs for these filters are a function of the toothbrush brands, habitual behaviors of individual users and can be configured in the pre-processing unit. A low-pass filter can be applied to the resulting data set 700 to prepare for gesture recognition. FIG. 11 illustrates the result of low-pass filtering in the pre-processing unit for a brushing session using a 3-axis accelerometer as the motion sensor. The result of a low-pass filter 703 to the output of an accelerometer is the orientation change of the toothbrush over time, which gets translated into the quadrant coverage result. The high-frequency component 704 is extracted and can be used for analysis for consistency and aggressiveness of the user's brushing gesture and technique. 704 contains further information about start and end of the brushing, as well as concentration level during brushing. FIG. 12 illustrates the output of high-pass filtering from the pre-processing unit using a 3-axis accelerometer as motion sensor. Other transformations of the raw data can be carried out from raw acceleration data or that of a 9-axis gyroscope using a similar concept for pre-processing.

Because the tracker is attached to the toothbrush, any movement of the toothbrush is recorded and reported to the tracking system server for analysis. Sometimes the movements recorded are irrelevant for a brushing activity. This is different from an electric toothbrush product, on which the start and end of brushing could easily be determined from the states of the on-off power switch. This presents a unique challenge in the presently disclosed system. A false-positive detector is designed to eliminate gestures and movements that are not related to any actual brushing events or activity. The false-positive detector includes two comparators for determining the actual start and end indices from a brushing data set, as well as a rule-based decision tree. The first comparator compares the high-frequency component of the motion signal against a calibrated threshold. An accumulator is used to count the number of seconds from which signals with substantial frequency alternations are observed. The accumulator is configured to work over a rolling window. If the accumulator's output for the window is higher than a calibrated threshold, then the start of the brushing activity is detected. The second comparator compares the number of seconds in a rolling window whose total number of seconds with frequency alternation is lower than a predefined threshold. If the accumulator's output is lower than a defined value for a rolling window, then the end event is detected by the comparator. The duration of the brushing activity is therefore determined by subtracting the start from end index, then divide by the sample rate.

A rule set, embodying aspects of the brushing algorithm, is used to assign a score of likelihood to determine if this dataset was from an actual brushing activity. Multiple indicators may be used beside the criteria of a minimal duration. For example, the ratio of actual brushing time and data set length can be used as an indicator for brushing effectiveness. A high ratio indicates a higher-level of effectiveness and a very low ratio suggests this is not from an actual brushing session. Another good indicator is the total number of transitions among different quadrants. A lack of quadrant navigation reduces the likelihood for the dataset. The rule-based decision tree takes in these indicator results, along with other forms such as movement speed, frequency, standard deviations etc., to determine if the dataset is from an actual brushing session, or merely children taking the toothbrush out from a drawer or waving in the air.

The quadrant analyzer is an algorithm that determines the percentage of time a user spent brushing in each quadrant. It uses a heuristic-based A-star search algorithm to determine the best likely transition path and trajectory of the toothbrush among the quadrants. The time spent in each quadrant as well as time percentage are output from this algorithm.

The score-generator is a deterministic algorithm that assigns scores to brushing performance indices. An overall score can be assigned based on the score awarded for each individual index using a decision algorithm. The indices include but are not limited to total brushing duration, active brushing time, consistency of gesture, coverage of each quadrant, up-down and circular movement of the brush, number of transition among quadrants, time spent idle. An overall score can be assigned based on individual score for each index for a brushing session. The overall score as well as individual score are tracked for a user over time and are also compared with other users in similar age group and geographical characteristics.

Figure 13:
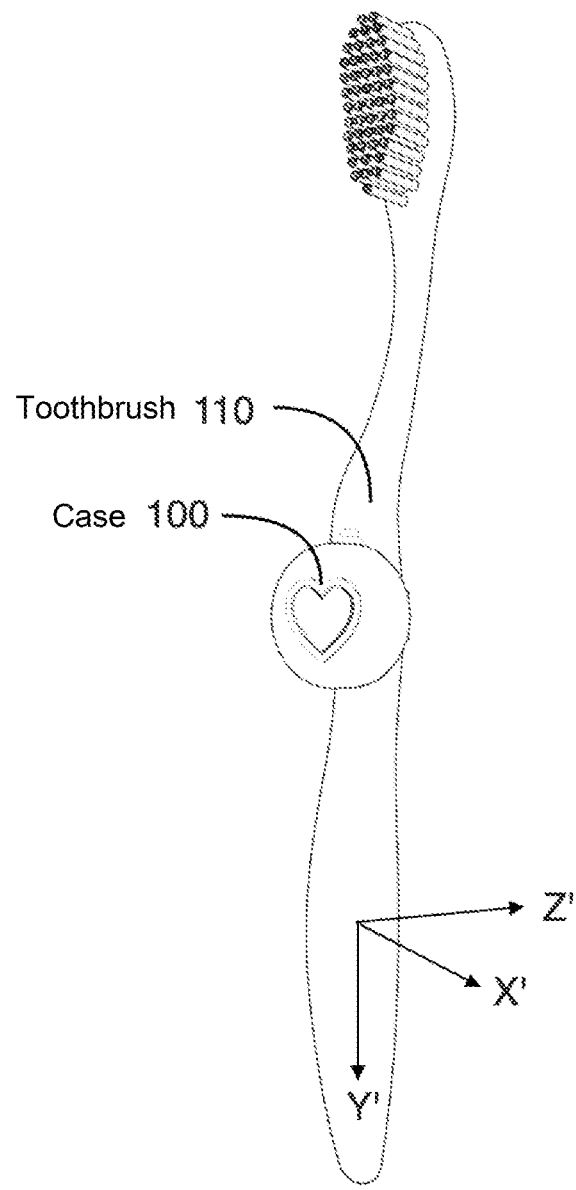
FIG. 13 illustrates transformation of raw signal into vectors along the toothbrush handle.
Figure 14:
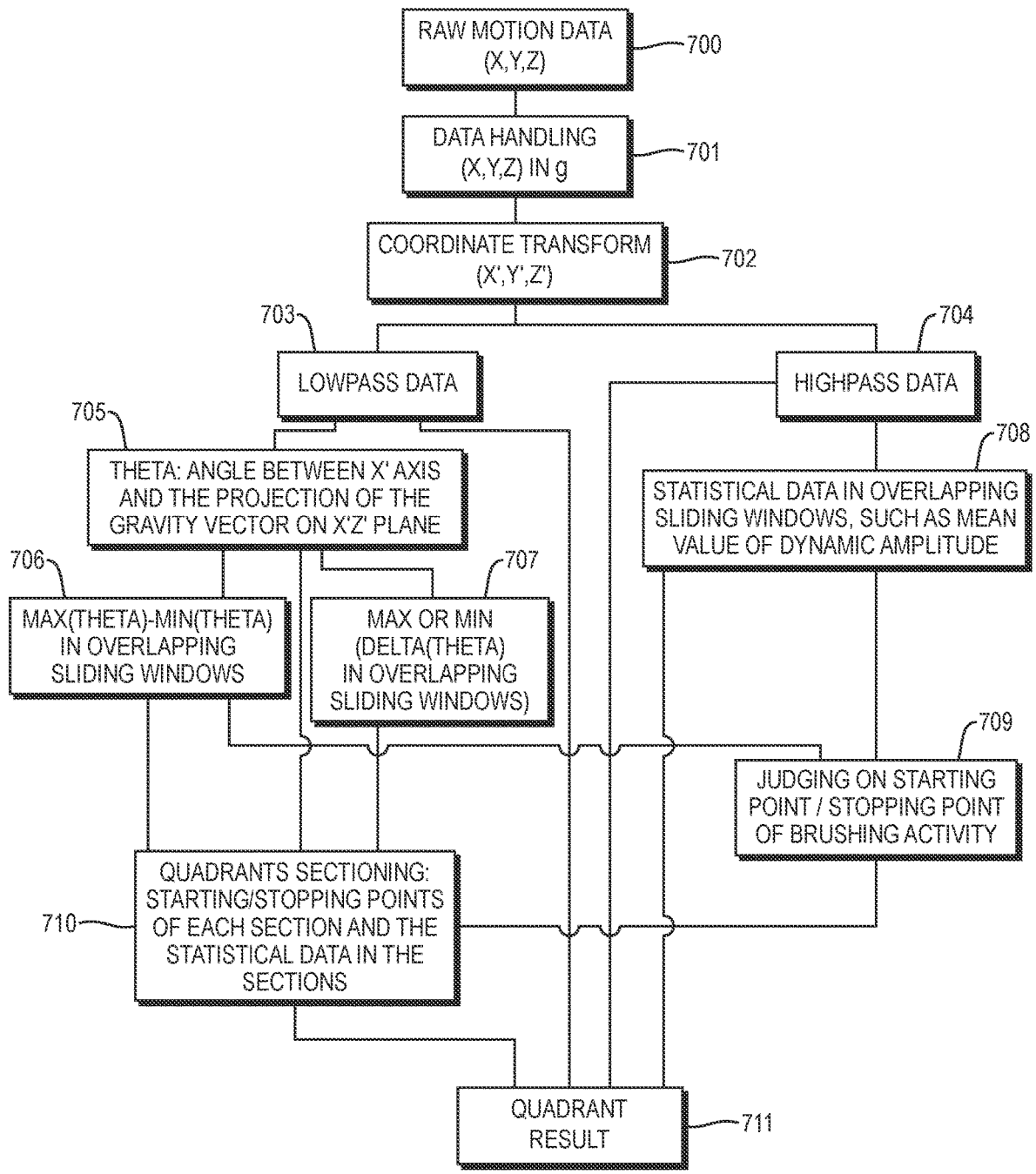
FIG. 14 illustrates a process for computation of quadrant coverage from a raw motion signal.

Referring to FIGS. 13 and 14, the raw motion data 700 are recorded as the X, Y, Z data processed by the compression processor 230 from the motion sensor 225. Since the tracker is attached to the toothbrush with a fixed position and the motion sensor 225 is fixed inside the tracker, the motion sensor is fixed to the toothbrush 110. According to the data handling approach 701, let the basic unit be 'g', then a coordinate transforming 702 is used to convert the raw data XYZ to data X'Y'Z' with Y' along the toothbrush handle.

To obtain a new coordinate system X', Y', Z', one can rotate original X,Y,Z coordinate systemtheta1 on X axis, theta2 on Y axis and theta3 on Z axis. The transforming formula would be:

$$\begin{bmatrix} X' \\ Y' \\ Z' \end{bmatrix} = \begin{bmatrix} \cos\theta_3 & \sin\theta_3 & 0 \\ -\sin\theta_3 & \cos\theta_3 & 0 \\ 0 & 0 & 1 \end{bmatrix} \begin{bmatrix} \cos\theta_2 & 0 & -\sin\theta_2 \\ 0 & 1 & 0 \\ \sin\theta_2 & 0 & \cos\theta_2 \end{bmatrix} \begin{bmatrix} 1 & 0 & 0 \\ 0 & \cos\theta_1 & \sin\theta_1 \\ 0 & -\sin\theta_1 & \cos\theta_1 \end{bmatrix} \begin{bmatrix} X \\ Y \\ Z \end{bmatrix}$$

There is no need of coordinate transformation if Y axis of motion sensor 225 is almost the same direction to Y' of the toothbrush 110. The analysis algorithm next uses X' Y' Z' as the source to obtain the LowPass data 703 and HighPass data 704.

An example of an implementation of the filtering algorithms used in 703 and 704 is as follows:

An implementation of LOW PASS and HIGH PASS Filter Algorithm:

```
coefficient=0.8
Filter BEGIN
   Low_X=coefficient*PreFiltered_X+(1-coeffiecient)
      *Current_X
   Low_Y=coefficient*Pre_Filtered_Y+(1-coeffiecient)
      *Current_Y
   Low_Z=coefficient*Pre_Filtered_Z+(1-coeffiecient)
      *Current_Z
   High_X=Current_X−Low_X
   High_Y=Current_Y−Low_Y
   High_Z=Current_Y−Low_Z
Filter END
```

Referring to FIGS. 14 and 15, from LowPass Data 703, the angle theta between X' axis and the projection of the gravity vector on X'Z' plane 705 could be produced for each of the indices by the following formula:

$$\theta = a\cos\left(\frac{x}{sqrt(x*x+z*z)}\right)*\text{sign}(z)$$

The temporal relationship in the motion signal over time is shown in FIG. 15. The angle between axis X' and the projection the gravity vector on plane X'Z', generated from LowPass Data 703, the absolute value of the difference between 2 consequent angles is not larger than 180 degrees.

Figures 16, 17:
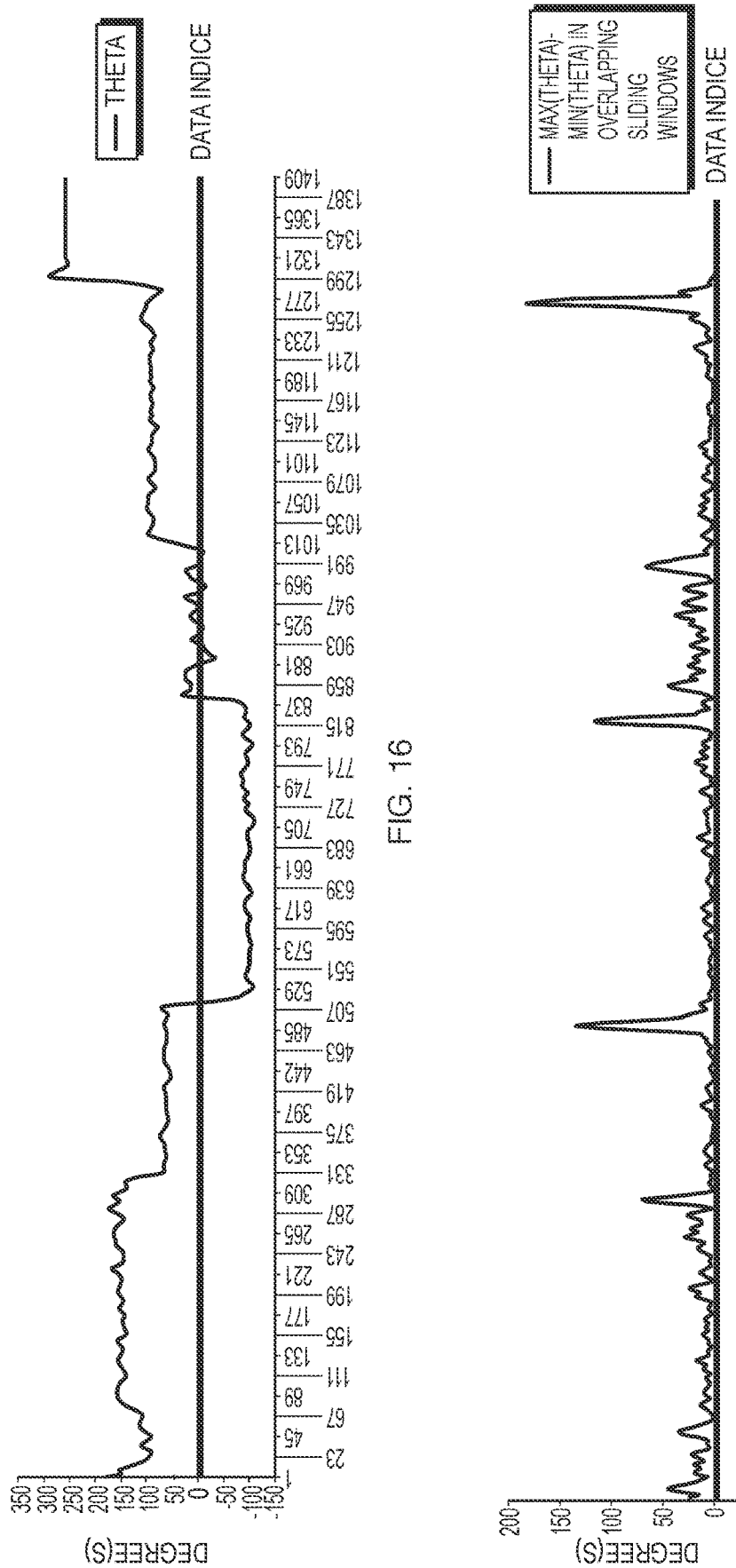
FIG. 16 illustrates the temporal relationship in the motion signal over time.
FIG. 17 illustrates Max(theta)-Min(theta) in Overlapping Sliding Windows.
Figure 18:
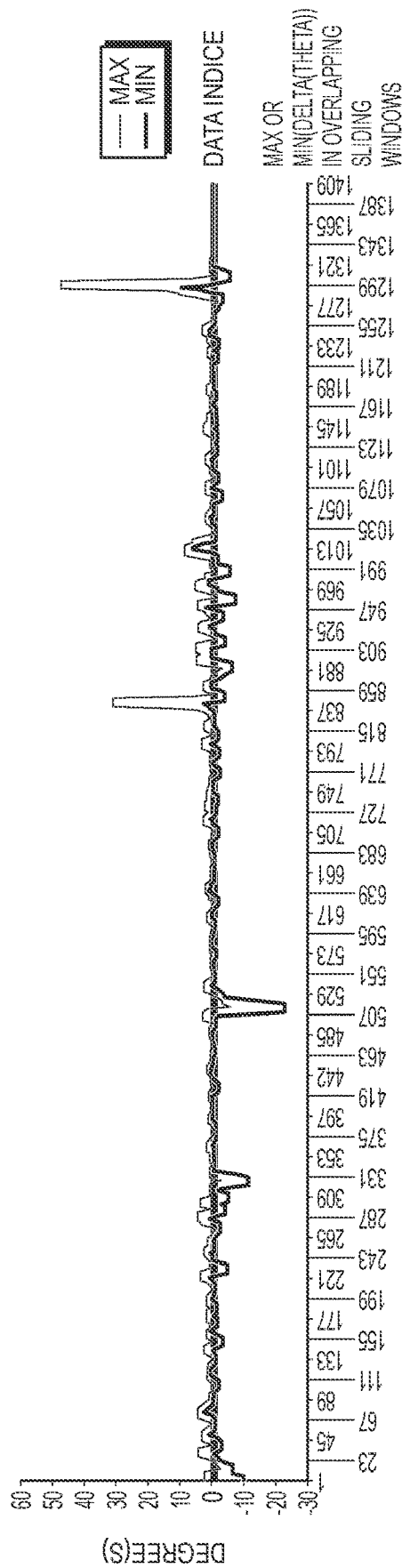
FIG. 18 illustrates Max or Min(delta(theta)) in Overlapping Sliding Windows.

Referring to FIGS. 14, 17 and 18, the technique of overlapping sliding windows is then used to generate the value of Max(theta)-Min(theta) 706 from 705 and Max or Min(delta(theta)) 707 from 705. Sliding widow is a common approach for activity pattern recognition. From 706 or 707, the algorithm finds when there is a detectable rotation on Y' axis. Sliding Window size can be configured to be 10, as the ODR (Output Data Rate) frequency of the raw motion data.

Figure 19:
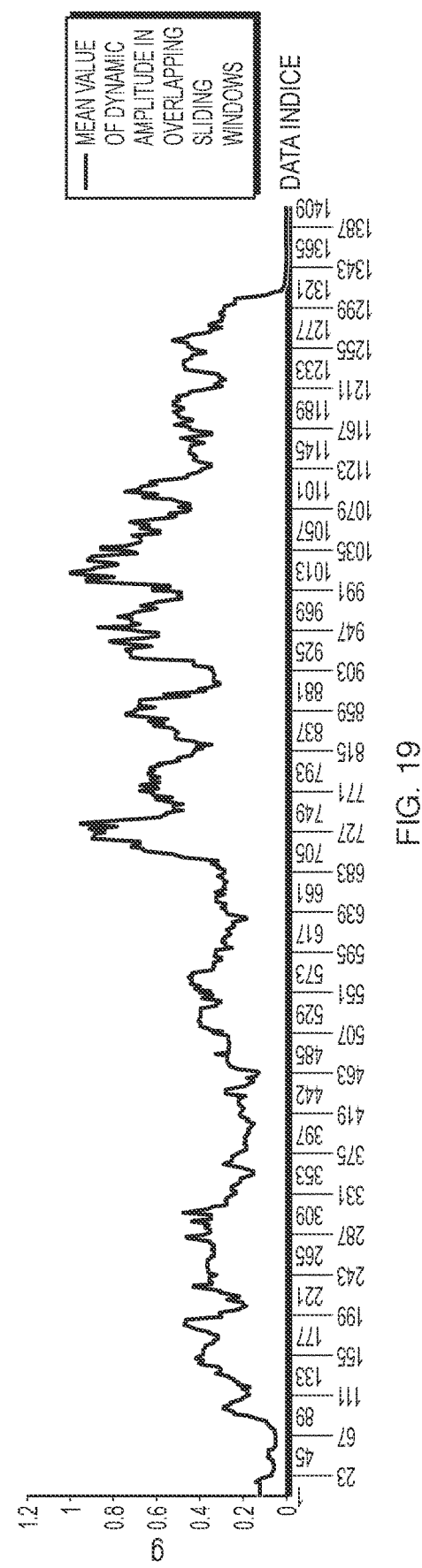
FIG. 19 illustrates Mean value of dynamic amplitude in Overlapping Sliding Windows.

Referring to FIGS. 14 and 19, statistical data such as mean value, standard deviation, and median of dynamic amplitude 708 is also generated from HighPass data 704 in the Overlapping Sliding Windows procedure.

Figure 20:
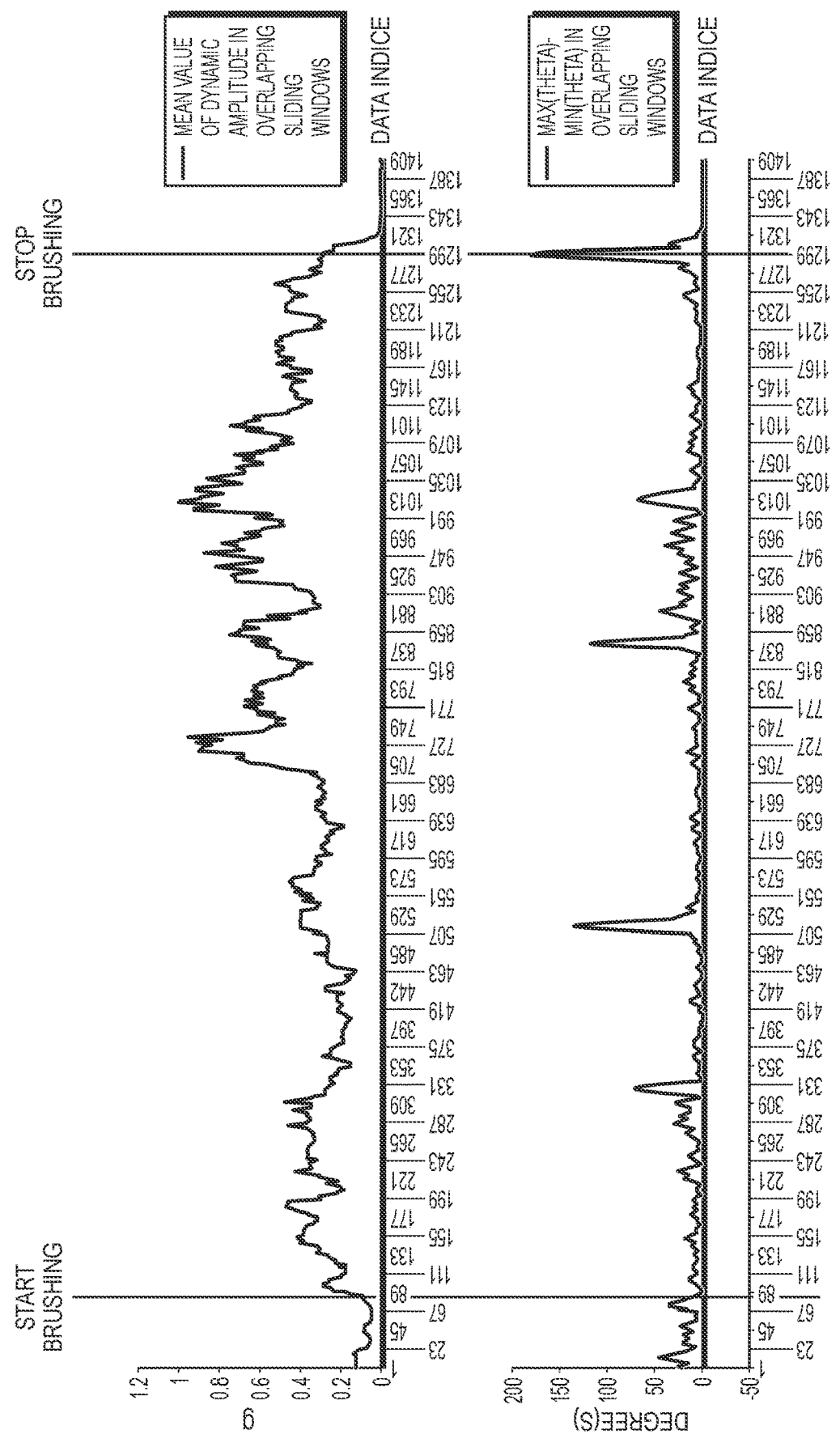
FIG. 20 illustrates determining starting point/stopping point of a brushing activity.

Referring to FIGS. 14 and 20, to determine the starting point and the stopping point of a brushing activity, Max (theta)-Min(theta) 706 and mean values of dynamic amplitudes 708 are used. If there is some high pulse from 706, the user may have moved substantially with the toothbrush. If the value of 706 is small but the mean value of dynamic amplitude 708 is high, the user's action on toothbrushing is confirmed. When the brushing activity is ended, the mean value of dynamic amplitude 708 should fall low for a while following a high pulse of 706. Thresholds for 706, 708 and the shortest time durations for 706, 708 can be configured.

In 710, quadrant coverage sectioning is implemented based on the max(theta)-min(theta) 706. The spikes of 706 section the brushing duration into different quadrants initially. In each quadrant, the value of theta would not change rapidly. The starting and stopping points of each quadrants are recorded and statistical data of each quadrant are calculated. The starting/stopping points could be fine-tuned. For example, if the stopping point of brushing activity is too close to the stopping point of the last quadrant, it will be adjusted.

Figure 21:
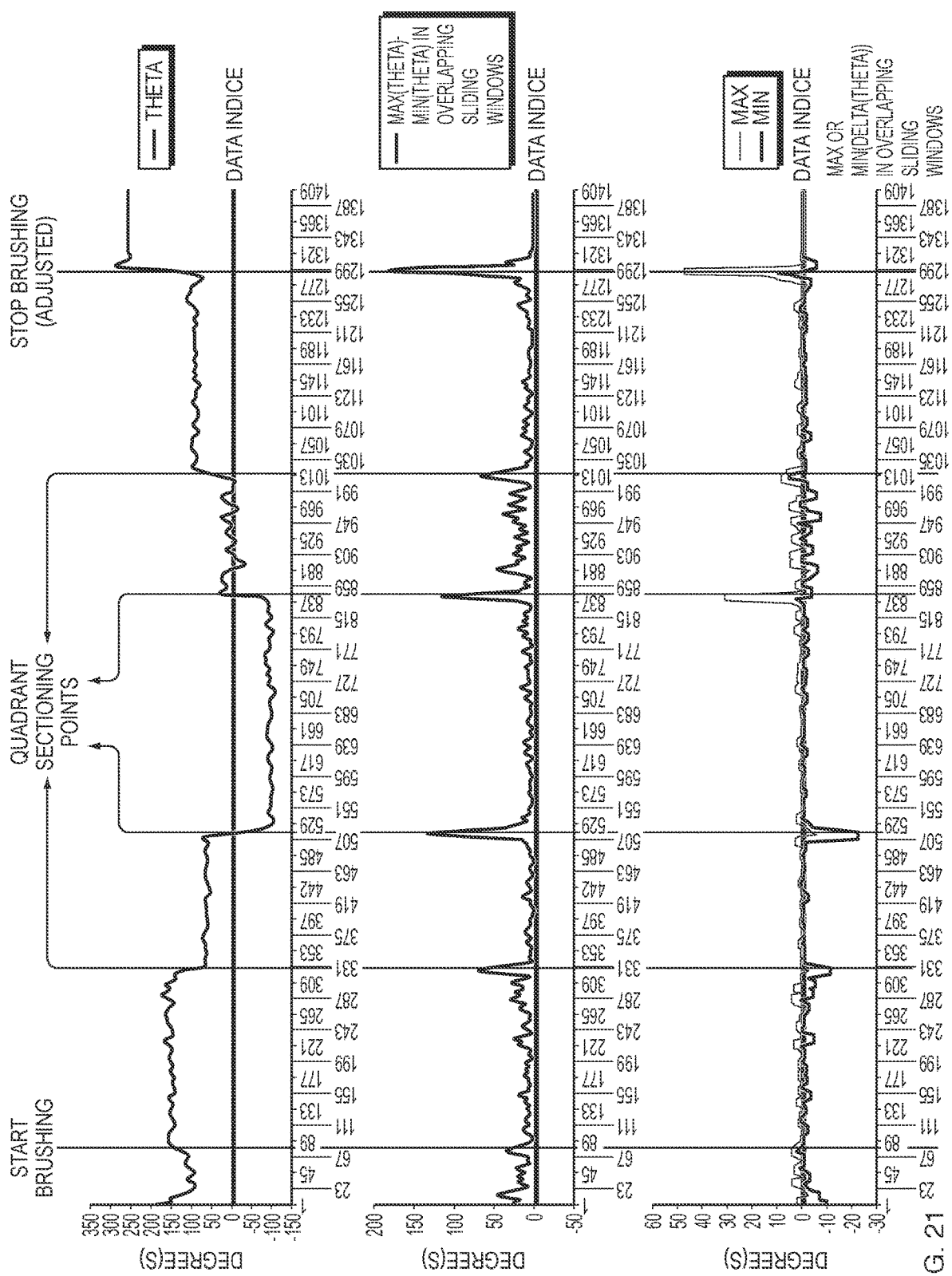
FIG. 21 illustrates quadrant sectioning.

Referring to FIGS. 14 and 21, in 711, re-sectioning a quadrant(a "split") could be made if in this section the statistical data vary largely in different parts even though the angle value theta 705 changes slightly. For example, if the mean value of the absolute value of X'/Y' from HighPass Data 704 vary largely, the section can be split to 2 sections.

Figure 22:
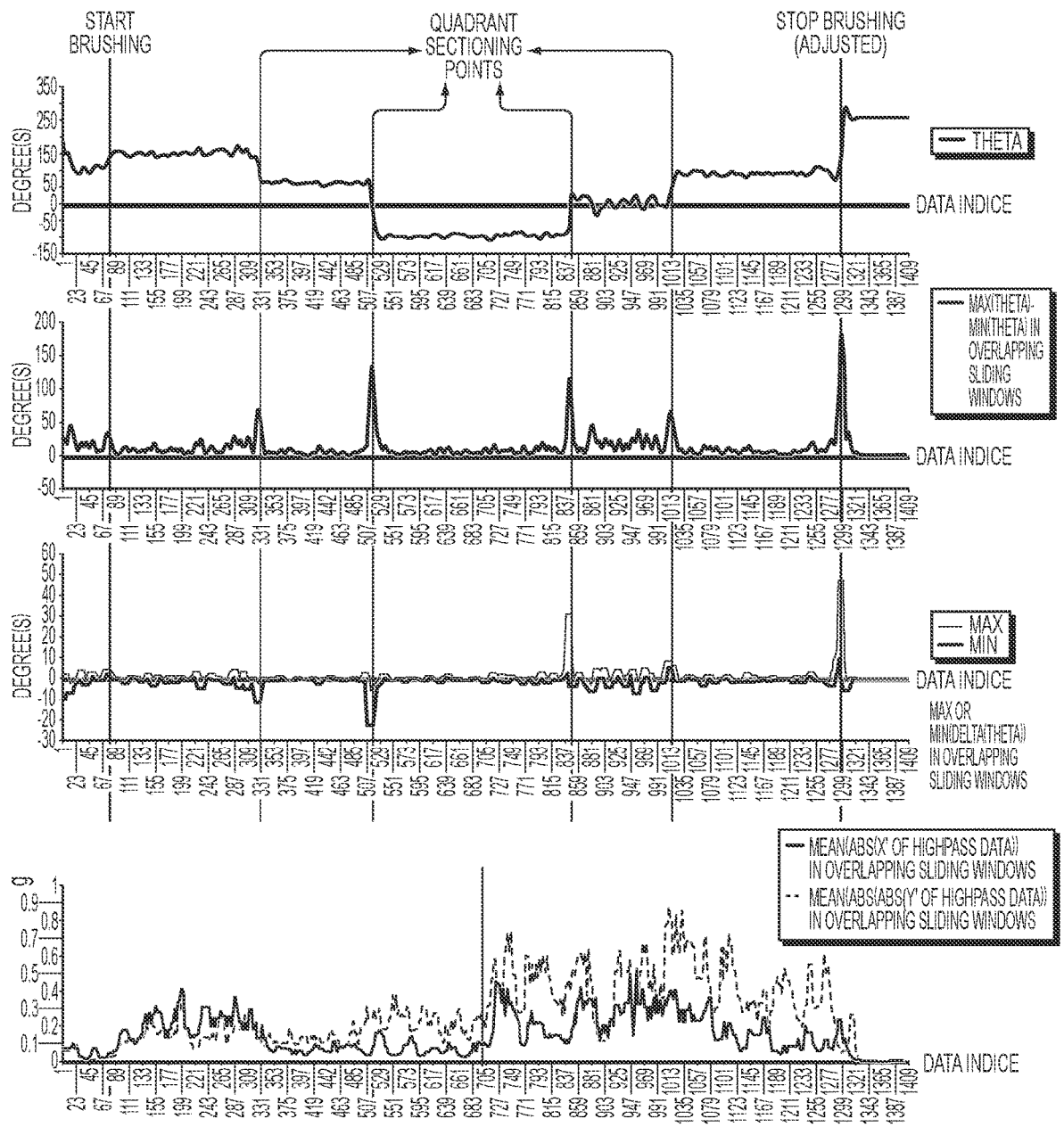
FIG. 22 illustrates re-sectioning one quadrant section to two.

Referring to FIGS. 14 and 22, after the quadrants are re-sectioned, the statistical data of theta or HighPass Data in each quadrant will be generated in 711. Based on the statistical data, the sections could be classified to different quadrant through a deterministic algorithm or using a classifier that is trained via machine learning.

Figure 23:
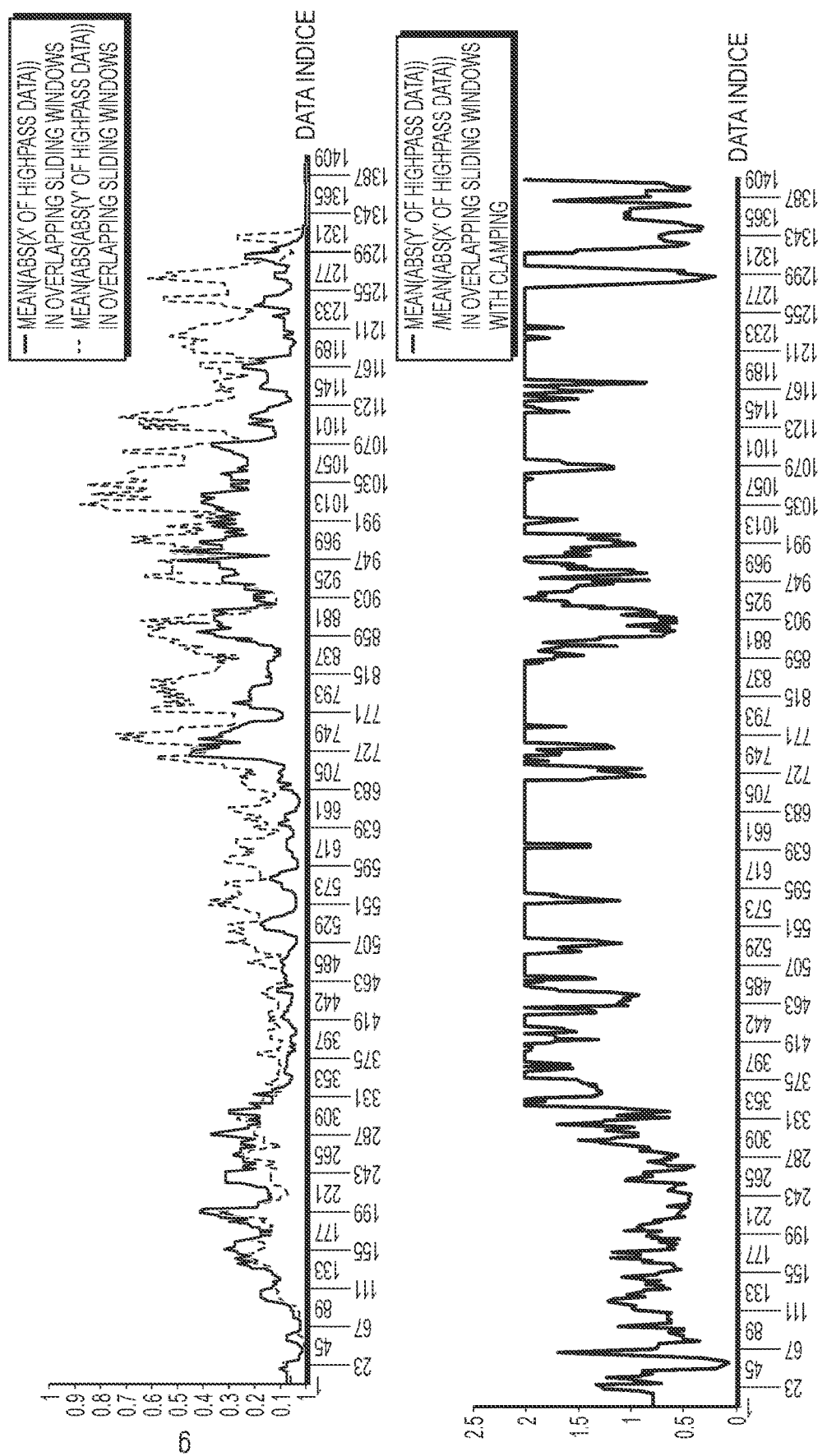
FIG. 23 illustrates generating the ratio of Mean(ABS(Y' of HighPass Data))/Mean(ABS(X' of HighPass Data)) in Overlapping Sliding Windows, which is used for calculating up-down motion percentage.

Referring to FIGS. 14 and 23, HighPass Data 704 are used to determine the fraction of time a user is performing up-down brushing motion. When a user brushes up-down along teeth, the amplitude on Y' is relatively smaller than the amplitude on X' axis. The Overlapping Sliding Windows technique can be applied to this data. The mean amplitudes on Y' axis and on X' axis can be used for temporal comparison against itself. The algorithm starts the comparison in 711 when the brushing starts. If in the current sliding window, the radio of Mean(ABS(Y')) and Mean(ABS(X')) is large, then movement along the Y' direction is dominating, otherwise the movement along the X' direction is dominating. Based on the definition of X' and Y', the algorithm can then assign a likelihood score of either brushing up-down or left-right for the current sliding window. If the ratio is close 1, the current sliding window may be assigned to a third state "Circular", which is indicted by the same amount of up-down motion and left-right motion.

Figure 24:
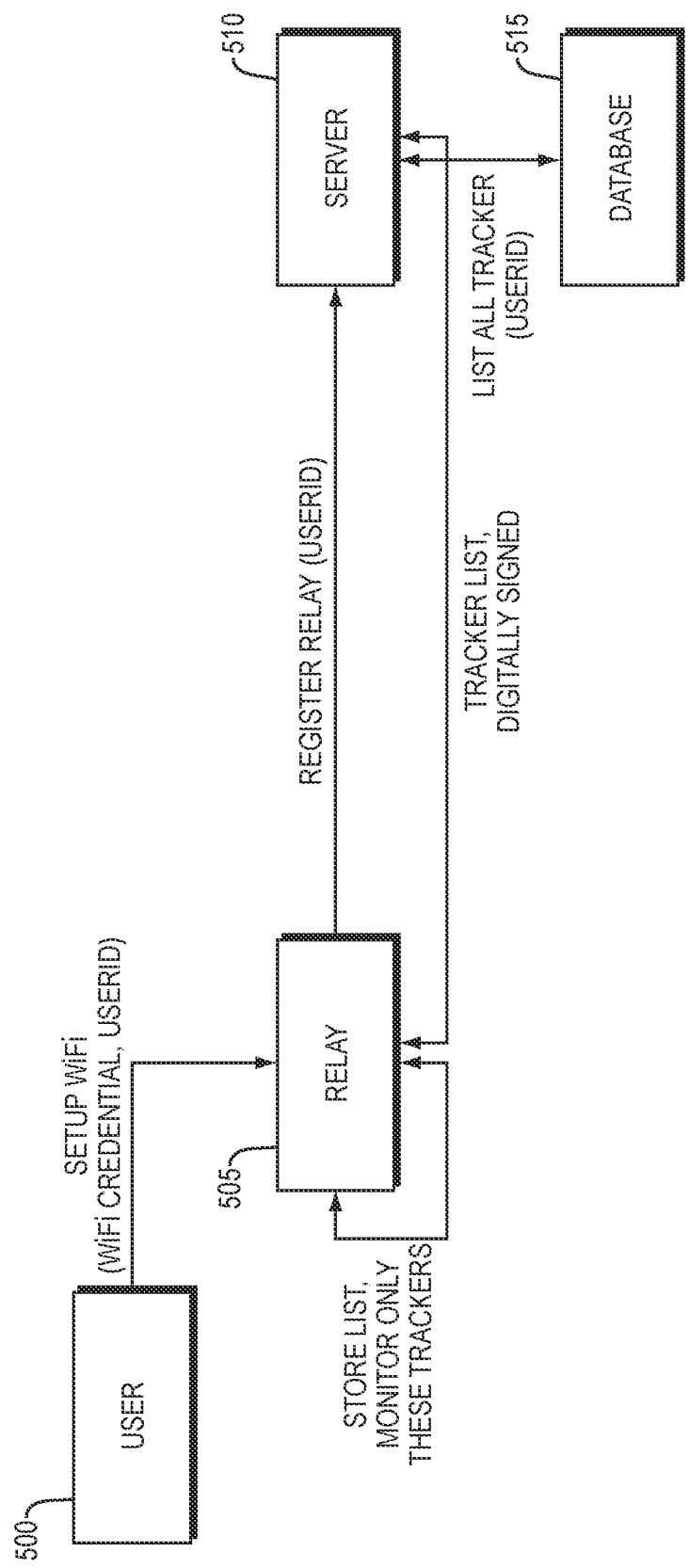
FIG. 24 illustrates relay setup and automatic tracker setup with data security.

Referring to FIG. 24, when motion data representing a brushing activity is generated and sent to the tracking server for processing, the server recognizes the data's ownership and knows to store the performance data under a particular user. This can be achieved using concepts of user account and profile, and through a pairing process during the setup of relay and tracker. In various embodiments, each user or user account 500 is identified with a user email which they use to sign up for the service. There can be multiple users under a user account, e.g., multiple children and parents. Each user under a user account can be associated with a different tracker and tracker ID. The setup of at least one relay is performed at the beginning with the companion mobile application. Additional relays may be added with the say procedure.

During the relay setup, a smart phone app, for example, notifies the relay about the user's account email, as well as the Wifi's (or other connection option) credential. The relay 505 connects to the selected Wifi and registers itself with the server under the user's account. The server looks up 510, 515 for all trackers under the user's account and sends a digitally signed list of tracker IDs to the relay 505 via the secure connection. From this point on, the relay will only respond to data communications originating from and to one of the trackers from that list.

When a new tracker with an unknown ID requests data communication, the relay first checks for the RSSI of the tracker's advertising signal to determine if the tracker is nearby. If the tracker is nearby, the relay attempts to register the tracker with the server under the user account associated with the relay. If the registration is successful, a new tracker is added to the relay's maintenance list and the updated list is sent back to the relay for monitoring. In preferred embodiments, registering a new tracker can be done without the need of a smartphone application. There is no pairing and Bluetooth setup required when adding the tracker. The process is user intuitive and is as simple as pressing on the tracker's button to transition it out of the "shelf-mode". The relay finishes the registration seamlessly in the background and the tracker becomes ready to monitor brushing activities.

It is convenient to allow the creation of profiles for users and associate each tracker with a defined profile. This is helpful when the same user registers multiple trackers over time. The same profile ID is used and is associated with different tracker IDs in different time periods. A user account may contain several profiles. For example, a parent account can have two profiles for two children. A profile can include a child's name, age group, gender, toothbrush type (manual or electric), as well as notification and alerting preferences among other additional information. A tracker can be associated with a profile during configuration using a smart phone/tablet application. The data processing engine has access to a database containing mappings between tracker ID and profile ID. With this mapping, brushing performance indices can be easily searchable by either profile ID and tracker ID.

Figure 25:
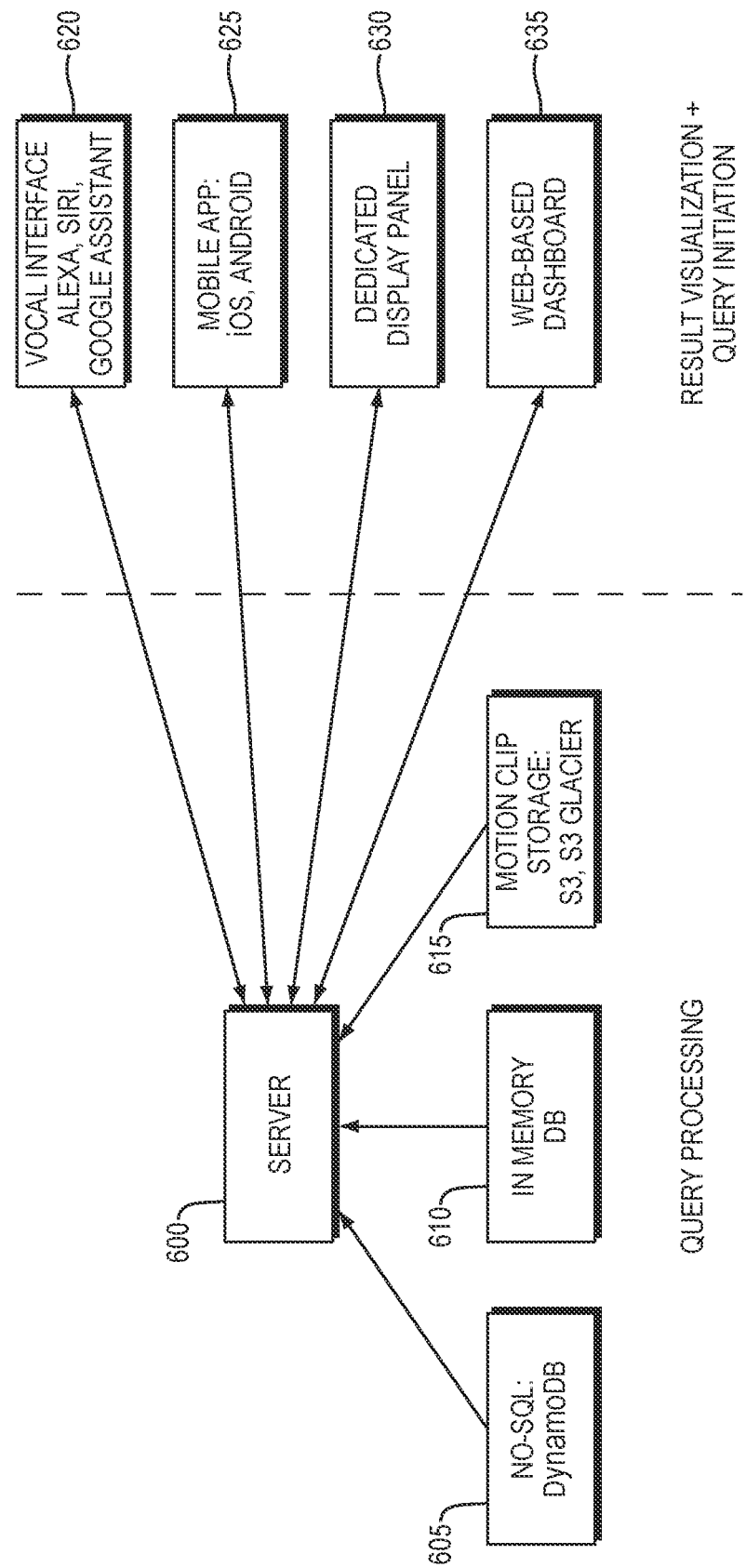
FIG. 25 illustrates interfaces of smart speaker, mobile app, dedicated display panel and dashboard with message exchange with server for query and result extraction.

Referring to FIG. 25, the system provides access to parents and can also provide access and information to dentists about details of brushing activities and progress via one or more convenient interfaces. The brushing quality results are multi-perspective and include performance indices of present and historical brushing sessions, as well as their time series progression. Rankings in a similar social-geographical population, for example, and in a defined member group are also presented in various embodiments.

In an embodiment of the interface design, the brushing results are retrieved, compiled and delivered to parents and, optionally, dentists via a number of channels including smart voice speaker, smart phone, tablet, dedicated display, database, email, text message, and/or web-based dashboard. The interfaces can be interactive. It is possible for users to send in a query for data and presentation of results. The queries can be presented via the interfaces to the server. Based on the query, the server retrieves data from its primary and secondary data storage and constructs the results. The results are then delivered to the interface to be presented to the user.

To facilitate speedy response, the server 600 may need to store data using different storage technologies. Some data, such as movement raw data, requires large storage space and is usually retrieved using its primary encryption key. This type of data is suitable to be stored in a file storage, such as the AWS S3 and S3 Glacier 615. Data such as performance indices for a user profile that are frequently queried by mobile and web applications are stored in a high-performance No-SQL database with multidimensional indices, such as DynamoDB 605. Data such as Tracker ID, Relay ID, profile ID and their mappings that need to be looked up in real-time as millions of trackers are simultaneously reporting need to be stored in a primary storage, such as an in-memory database or a primary caching 610, to reduce latency.

During the exchange of query and query results between an interface and server, data security is implemented to ensure secrecy and authenticity of the underlying messages. At the transportation layer, the system uses two-way SSL and/or TLS to ensure data-in-transit security. The application-level user authentication can be implemented using issuance and replenishment of access token and bearer token, e.g., like in OAUTH2 and AWS Cognito.

The system integrates with smart home speaker systems 620 to allow query of results and reporting of performance indices of brushing activities. Keywords related to a "skill" can be registered with a smart speaker provider, such as Alexa. Users can then invoke queries and interact with the system using voice. During a query speech, the action and query details are received and parsed by the smart speaker, the intention of query is then sent to the server for processing. The system implements the interface of the smart speaker provider to return the query result. The result can then be recited vocally by the smart speaker be heard by the user.

In some embodiments the system allows users to visualize performance indices and details of each brushing session using a dedicated smart application running on a smartphone or a tablet 625. The application is designed to communicate with the server to retrieve account-based information after user signs in with his/her account.

In some embodiments the system can include a dedicated, permanent digital display panel 630 used to display scores and details of recent brushing activities with data and graphs. This permanent digital display panel can be placed in the bathroom or a common living area where family members can view each other's score as well as coach and encourage each other for better future brushing sessions. The digital display connects with the tracking server using Wifi or LTE cellular. It can be either battery powered or via a cord from an external power source or an adaptor. The panel is configured to be linked to an account. This can be done by using an external cord and input device or via its touch screen and soft keyboard. The permanent display is preferably water and dust proof, particularly if it is located in a brushing area.

The display panel can be configured to support a range of styles for displaying brushing data and historical statistics. Users can configure the panel to select which performance index to display, which profile to display, as well as details of brushing activities and their corresponding display options. The software running on the dedicated display can be updated wirelessly or via a cord.

A web-based dashboard 635 is available to view brushing data and progress for parents and dentists. The dashboard enables data review and monitoring for a group of users. Parents and dentists can see high-level statistics for a selected user population, as well as listing of all users and details of individual tracking sessions. A calendar view details brushing activities for each session, with progress and trend can also be reported for the user profile.

Figure 26:
FIGS. 26 through 28 are screenshots of a Web-based dashboard showing performance metrics for all users under monitoring as well as detailed tracking information for a user profile including performance of historical activities as well as that of a single brushing activity.
Figure 27:
Figure 28:
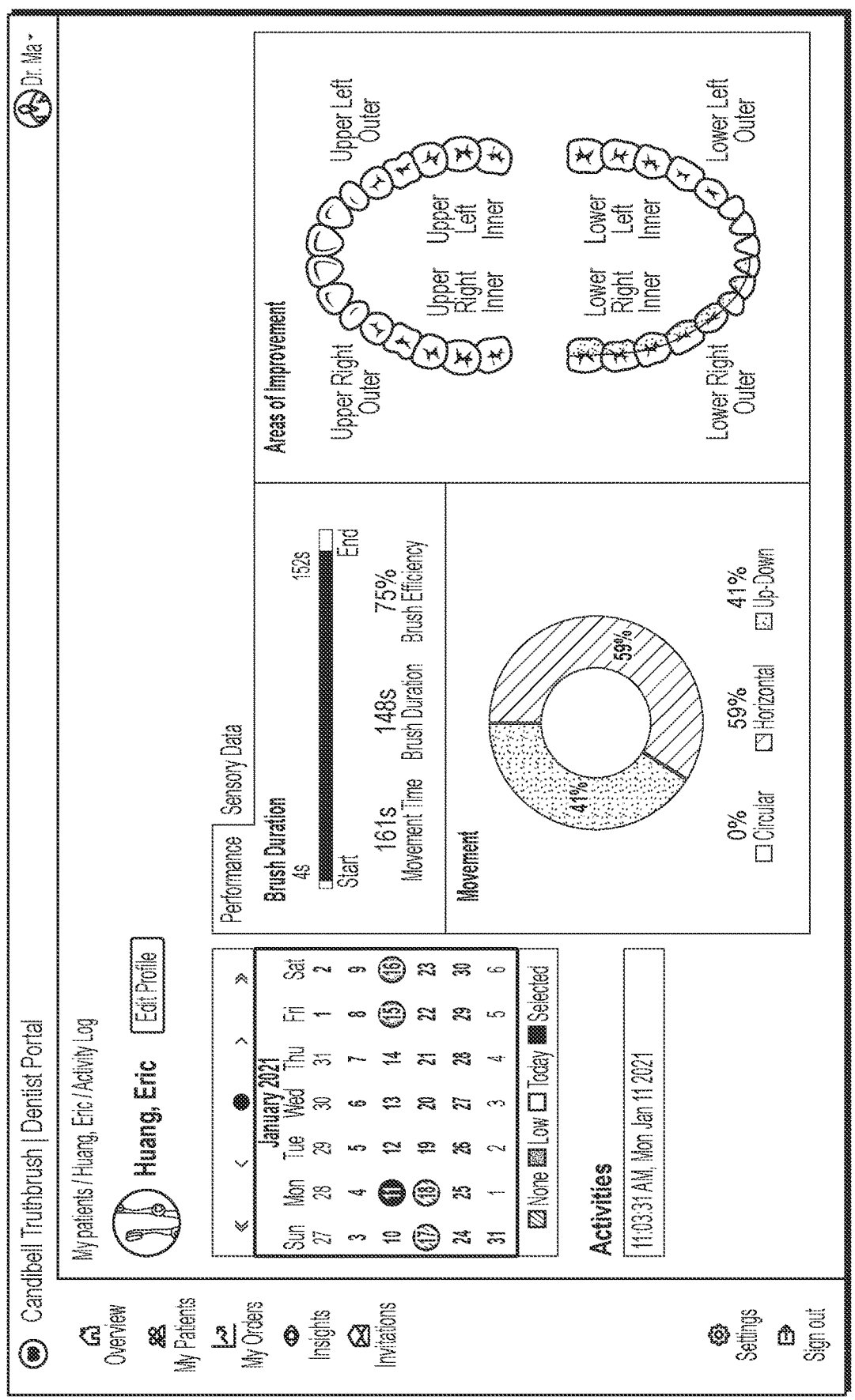

Referring to FIGS. 26-28, in some embodiments, one of the features offered by the system is ranking of different brushing performance indices. Users can choose to rank by a user profile's overall score, or score from an activity or from a set of activities over time to study progression and improvement. In various embodiments, the system also allows ranking among profiles based on a set of criteria.

To access and be able to compare one's data with data sets from other profiles, a user needs to first send a permission request to the other profile's owner. This step is completed by the other account accepting the request. Such request can be initiated using any of the interfaces disclosed above, e.g., via voice, mobile application, or a dedicated permanent display with interactive touch screen. After the user selects the ranking criteria, such as brushing duration or number of counts over a period of time, the server serves the request and returns a list sorted by the criteria. The position of profiles from a user in the list as well as top performers can be displayed or recited, or otherwise output, by the system.

In various embodiments, the server allows setting alarms based on a set of selected ranking results and criteria. For example, parents can choose to receive an alarm if a child's overall oral hygiene ranking drops below 90 percentiles in an age group in a geographic region. The alarm can be a push notification to a mobile device, a SMS message, an automated phone call, a JavaScript notification rendered within the online dashboard, or a voice-based interaction and alert delivered via a smart speaker system. The alert can be sent to one or both parents and/or the child.

In an embodiment, the system allows parents and children to setup a customized reward program. Parents and children can define goal to be met and the corresponding reward. The system stores the goal and reward definition, and acts as an accountable tracking system. Both parents and children can review the progress and results with the system.

As an example, a goal definition can contain simple criteria, such as brushing twice every day. It could also be a more complex definition requiring conjunctive combination of multiple simple criteria, such as brushing twice every day and achieving 2 minutes of brushing with full quadrant coverage for the past week. Parents can specify when the system should verify if the goal was achieved based on the records. During verification, the system reviews brushing data stored in its database and notifies parents and optionally the children and dentists if such a goal was met. A reward can be defined and stored along with the goal definition. If a goal is met, the parents and children are notified with the status, which could be displayed or output in any of a variety of manners. In case the goal wasn't met, the system explains why the records fail to meet the criteria. Parents can specify a goal and get results from the system via any one of the interfaces the system supports, such as via a smartphone application, query with a smart speaker, or via a dedicated display panel discussed above. Likewise, children and dentists can configure how they want to be presented with the results and reports. Parents can specify an "away mode" when they go on vacation without the tracker. Missing brushing when "away mode" is enabled will not negatively affect a profile's score or be included into its performance calculation for the missing period.

In various embodiments, the system keeps track of the time and number of brushings performed for each tracker. The timer and counter get reset when a tracker is setup and attached to a toothbrush. When the measured number of brushings and/or accumulative duration exceed the recommended condition, the system can notify the user via email, SMS, mobile push notification or a smart speaker. In various embodiments, the system can also be configured to create an order for a new toothbrush, or a toothbrush head. The total number of brushes and duration that triggers a replenishment can be configured in the system. In case that the tracker needs replacement, e.g., a battery is determined to be end of life based on charge level, the system can also initiate a new order to replace the tracker or a tracker battery. When a user's credit card is on file, the system automatically charges the card to complete the transaction and fulfill the order.

Although this disclosure uses examples of parents monitoring children for oral care. The disclosure articulates essentially a remote monitoring technology stack that can also be used for adults and seniors. In these use cases, family members, members of care circles, such as nurses, dentists, and doctors, can monitor patients for their daily oral care activities. Exchange of query and results via multiple interfaces is supported in a similar concept.

The data availability of brushing and other oral care activities, such as flossing, use of mouthwash, antibiotics can help caregivers and doctors better engage with dental patients. The data can also help insurance companies to identify compliance issues for individuals. Using automated systems, insurance companies can assess different premiums to different persons based on an algorithm and their brushing history and performance ranking. The premium may be adjusted at some predetermined frequency. A discount may be provided if an individual meets the criteria and is verified by the system.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A toothbrushing monitoring system, comprising:
a tracker configured to be mounted to a toothbrush and comprising:
at least one motion sensor configured to generate first raw motion data in response to detection of motion of the toothbrush; and
at least one transceiver configured to output packets of the first raw motion data generated by the at least one motion sensor without analyzing the first raw motion data to identify a first quadrant coverage associated with the tracker;
at least one relay device configured to wirelessly receive the packets of the first raw motion data from the tracker and communicate the packets of the first raw motion data over a network without analyzing the first raw motion data to identify the first quadrant coverage associated with the tracker; and
a remote processing system comprising a server and a database, separate from the tracker and the at least one relay device, configured to:
receive the packets of the first raw motion data transmitted over the network;
receive other packets of a second raw motion data from a plurality of other trackers that are communicated by a plurality of other relay devices that do not receive the packets of the first raw motion data from the tracker, and
process the packets and the other packets to identify the first quadrant coverage associated with the tracker and a second quadrant coverage associated with each one of the plurality of other trackers to generate brushing data that is further processed to determine comparative brushing adequacy based on predetermined criteria,
wherein the packets and the other packets arrive at the server at overlapping periods of time and in variable order, and wherein the server is configured to concatenate the packets that are associated with a first same brushing activity, concatenate the other packets that are associated with a second same brushing activity, verify integrity of the packets and the other packets with message digest, verify correct sequence ordering of the packets and the other packets with monotonically increasing counters, and verify message entirety with flag indicators.

2. The toothbrushing monitoring system of claim 1 wherein the remote processing system further comprises data receivers, and wherein each data receiver receives the packets of the first raw motion data from the at least one relay device and receives the other packets of the second raw motion data from the plurality of other relay devices and extracts the first raw motion data from the packets and extracts the second raw motion data from the other packets.

3. The toothbrushing monitoring system of claim 2 wherein the server is configured to transform the first raw motion data from said each data receiver and the second raw motion data from said each data receiver into transformed first raw motion data and transformed second raw motion data in a supported format, and then process the transformed first raw motion data and the transformed second raw motion data to perform analysis of brushing performance and adequacy, based on a set of criteria, models and algorithms.

4. The toothbrushing monitoring system of claim 1 wherein the at least one relay device is configured to perform, on the first raw motion data, one or more of: data compression, de-compression, encryption, decryption, digital signature, authentication, hashing, and the message digest.

5. The toothbrushing monitoring system of claim 1 wherein the tracker comprises a rigid housing in which the at least one motion sensor and the at least one transceiver are disposed.

6. The toothbrushing monitoring system of claim 5 wherein the tracker further comprises a flexible case in which the housing is disposed.

7. The toothbrushing monitoring system of claim 6 wherein the tracker further comprises an attachment band adapted to reversibly mount the tracker to the toothbrush, the attachment band being integral to the flexible case.

8. The toothbrushing monitoring system of claim 5 wherein the tracker further comprises an attachment band adapted to reversibly mount the tracker to the toothbrush, the attachment band comprises a loop retained by anchors on the housing.

9. The toothbrushing monitoring system of claim 5 wherein the tracker is affixed to the toothbrush with at least one of: an elastic band, a ring, a tape, a clasp, a sleeve, a dock, a hook, a zipper, a screw, a clip, and an adhesive.

10. The toothbrushing monitoring system of claim 1 wherein the tracker further comprises a button that causes the tracker to exit a low power mode.

11. The toothbrushing monitoring system of claim 1 wherein the tracker further comprises at least one feedback peripheral.

12. An apparatus comprising:
a housing that is configured to be mounted to a toothbrush;
a tracker comprising the housing and further comprising:
at least one motion sensor disposed within the housing and configured to detect motion and generate a first raw motion data in response to the detection of the motion; and
at least one transceiver disposed within the housing and configured to output packets of the first raw motion data generated by the at least one motion sensor from the housing to a remote processing system;
wherein the remote processing system comprising a server and a database that receives the packets of the first raw motion data and receives other packets of a second raw motion data from other transceivers associated with other housings mounted to other toothbrushes from other households and processes the packets of the first raw motion data and the other packets of the second raw motion data to identify a first quadrant coverage associated with the toothbrush and a second quadrant coverage associated with the other toothbrushes, whereby the first raw motion data from the toothbrush is made available for processing with the second raw motion data from the other toothbrushes to generate brushing data indicative of comparative brushing activity,
wherein the packets and the other packets arrive at the server at overlapping periods of time and in variable order, and wherein the server is configured to concatenate the packets that are associated with a first same brushing activity, concatenate the other packets that are associated with a second same brushing activity, verify integrity of the packets and the other packets with message digest, verify correct sequence ordering of the packets and the other packets with monotonically increasing counters, and verify message entirety with flag indicators.

13. The apparatus of claim 12 wherein the housing is rigid and is disposed in a flexible case.

14. The apparatus of claim 12 further comprising an attachment band adapted to reversibly mount to the toothbrush.

15. The apparatus of claim 14 wherein the attachment band is integral to a case.

16. The apparatus of claim 14 wherein the attachment band comprises a loop retained by anchors on the housing.

17. The apparatus of claim 12 further comprising a button that causes the tracker to exit a low power mode.

18. The apparatus of claim 12 further comprising a feedback peripheral.

19. A method comprising:
sensing motion and outputting packets of a first raw motion data with a plurality of trackers, each of the trackers configured to be mounted to a different toothbrush of a plurality of toothbrushes, at least some of which are in different households, and comprising at least one motion sensor configured to generate the first raw motion data and at least one transceiver configured to output the packets of the first raw motion data; and
receiving and processing the packets of the first raw motion data and other packets of a second raw motion data from other trackers mounted to other toothbrushes from other households by a remote processing system;
wherein the remote processing system comprising a server and a database, outside the trackers, to identify a first quadrant coverage associated with each of the trackers and a second quadrant coverage associated with each of the other trackers, and to generate brushing data that is further processible to determine comparative brushing adequacy based on predetermined criteria,
wherein the packets and the other packets arrive at the server at overlapping periods of time and in variable order, and comprising the server concatenating the packets that are associated with a first same brushing activity, concatenating the other packets that are associated with a second same brushing activity, verifying integrity of the packets and the other packets with message digest, verifying correct sequence ordering of the packets and the other packets with monotonically increasing counters, and verifying message entirety with flag indicators.

* * * * *